US012440759B2

(12) United States Patent
Yamauchi et al.

(10) Patent No.: US 12,440,759 B2
(45) Date of Patent: Oct. 14, 2025

(54) COMPUTER SYSTEM, GAME SYSTEM, AND EXECUTION CONTROL METHOD

(71) Applicant: BANDAI NAMCO ENTERTAINMENT INC., Tokyo (JP)

(72) Inventors: Kaito Yamauchi, Tokyo (JP); Satoshi Imashiro, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 338 days.

(21) Appl. No.: 18/105,473

(22) Filed: Feb. 3, 2023

(65) Prior Publication Data

US 2023/0182017 A1 Jun. 15, 2023

Related U.S. Application Data

(63) Continuation of application No. PCT/JP2021/021940, filed on Jun. 9, 2021.

(30) Foreign Application Priority Data

Aug. 6, 2020 (JP) ................................ 2020-133502

(51) Int. Cl.

*A63F 13/537* (2014.01)
*A63F 13/67* (2014.01)
*A63F 13/837* (2014.01)

(52) U.S. Cl.

CPC ............ *A63F 13/537* (2014.09); *A63F 13/67* (2014.09); *A63F 13/837* (2014.09)

(58) Field of Classification Search

CPC ...... A63F 13/533; A63F 13/537; A63F 13/67; A63F 13/837

See application file for complete search history.

(56) References Cited

U.S. PATENT DOCUMENTS

2004/0166914 A1* 8/2004 Ishihata .................. A63F 13/45 463/2
2007/0279392 A1* 12/2007 Rosenberg .............. G06F 3/016 345/173

(Continued)

FOREIGN PATENT DOCUMENTS

JP 2007-044206 A 2/2007
JP 2013-198692 A 10/2013
JP 2018-114192 A 7/2018

OTHER PUBLICATIONS

Aug. 31, 2021 International Search Report issued in International Patent Application No. PCT/JP2021/021940.

*Primary Examiner* — Steve Rowland
(74) *Attorney, Agent, or Firm* — Oliff PLC

(57) ABSTRACT

A computer system performs progress control of a game where a first team and a second team fight with each other in a game space including settings of a first team headquarters, a second team headquarters, and at least one intermediate base that either of the teams can alternately capture to use as a base. A game screen includes display of headquarters gauges whose gauge values increase or decrease in accordance with headquarters parameter values indicating conquered degrees of the first team headquarters and the second team headquarters. Capture difficulty of the intermediate base is adjusted based on the gauge values of the respective headquarters gauges of the first team and the second team.

18 Claims, 19 Drawing Sheets

(56) References Cited

U.S. PATENT DOCUMENTS

| | | | | |
|---|---|---|---|---|
| 2009/0215526 | A1* | 8/2009 | Matsumoto | A63F 13/45 463/23 |
| 2010/0009750 | A1* | 1/2010 | Egozy | A63F 13/335 463/35 |
| 2012/0220377 | A1* | 8/2012 | Cantor | A63F 13/795 463/42 |
| 2013/0337909 | A1* | 12/2013 | Pattison | A63F 13/60 463/29 |
| 2014/0024462 | A1* | 1/2014 | Qiang | A63F 13/795 463/42 |
| 2014/0155177 | A1* | 6/2014 | Crossley | G06F 16/00 463/43 |
| 2014/0357339 | A1* | 12/2014 | Urushihara | G07F 17/329 463/17 |
| 2017/0084129 | A1* | 3/2017 | Baerlocher | G07F 17/3211 |
| 2020/0016457 | A1* | 1/2020 | Ben-Chanoch | A63B 24/0006 |
| 2020/0139194 | A1* | 5/2020 | Min | A63B 24/0084 |
| 2020/0245019 | A1* | 7/2020 | Yin | A63F 13/45 |
| 2021/0101080 | A1* | 4/2021 | Matsushita | A63F 13/58 |
| 2023/0182017 | A1* | 6/2023 | Yamauchi | A63F 13/537 463/31 |

* cited by examiner

FIG.7

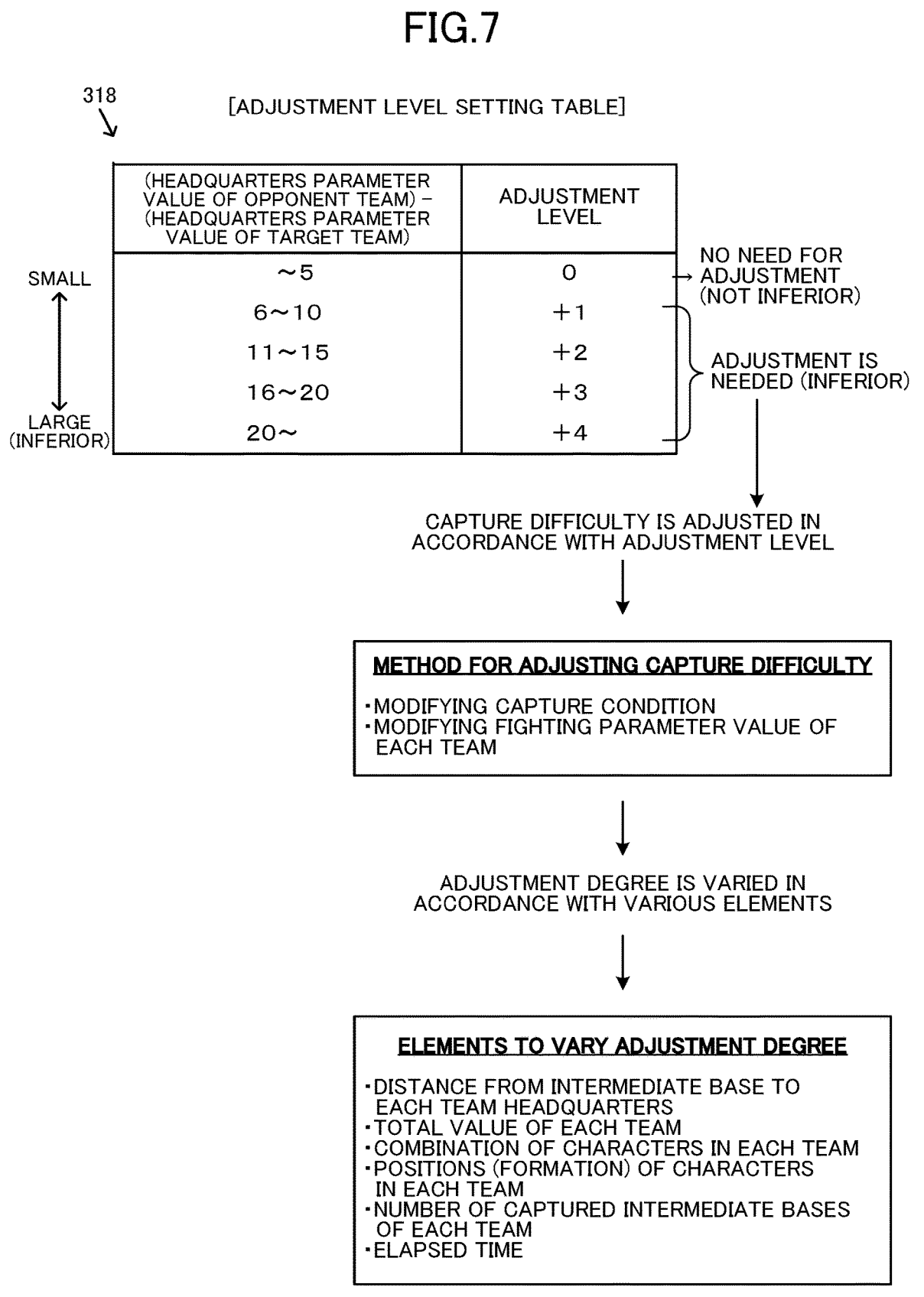

318

[ADJUSTMENT LEVEL SETTING TABLE]

| | (HEADQUARTERS PARAMETER VALUE OF OPPONENT TEAM) − (HEADQUARTERS PARAMETER VALUE OF TARGET TEAM) | ADJUSTMENT LEVEL | |
|---|---|---|---|
| SMALL | ～5 | 0 | NO NEED FOR ADJUSTMENT (NOT INFERIOR) |
| ↕ | 6～10 | +1 | ADJUSTMENT IS NEEDED (INFERIOR) |
| | 11～15 | +2 | |
| | 16～20 | +3 | |
| LARGE (INFERIOR) | 20～ | +4 | |

CAPTURE DIFFICULTY IS ADJUSTED IN ACCORDANCE WITH ADJUSTMENT LEVEL

↓

METHOD FOR ADJUSTING CAPTURE DIFFICULTY

- MODIFYING CAPTURE CONDITION
- MODIFYING FIGHTING PARAMETER VALUE OF EACH TEAM

↓

ADJUSTMENT DEGREE IS VARIED IN ACCORDANCE WITH VARIOUS ELEMENTS

↓

ELEMENTS TO VARY ADJUSTMENT DEGREE

- DISTANCE FROM INTERMEDIATE BASE TO EACH TEAM HEADQUARTERS
- TOTAL VALUE OF EACH TEAM
- COMBINATION OF CHARACTERS IN EACH TEAM
- POSITIONS (FORMATION) OF CHARACTERS IN EACH TEAM
- NUMBER OF CAPTURED INTERMEDIATE BASES OF EACH TEAM
- ELAPSED TIME

FIG.8

322(322A)

[CAPTURE DIFFICULTY ADJUSTMENT TABLE: ADJUSTMENT LEVEL=0]

| | | | |
|---|---|---|---|
| CAPTURE CONDITION | CHARACTER NUMBER CONDITION | | THREE OR MORE WITHOUT OPPONENT CHARACTERS |
| | TIME CONDITION | | TEN SECONDS |
| FIGHTING PARAMETER VALUE | TARGET TEAM | OFFENSIVE STRENGTH | —(NOT MODIFIED) |
| | | DEFENSIVE STRENGTH | |
| | OPPONENT TEAM | OFFENSIVE STRENGTH | |
| | | DEFENSIVE STRENGTH | |

FIG.9

[CAPTURE DIFFICULTY ADJUSTMENT TABLE: ADJUSTMENT LEVEL=1]

322(322B)

| ITEM TO BE MODIFIED | | | ADJUSTMENT DEGREE | | | |
|---|---|---|---|---|---|---|
| | | | ～1 (STANDARD) | 1～2 | 2～5 | 5～ |
| CAPTURE CONDITION | CHARACTER NUMBER CONDITION | | **THREE OR MORE WITHOUT OPPONENT CHARACTERS** | TWO OR MORE WITHOUT OPPONENT CHARACTERS | ONE OR MORE WITHOUT OPPONENT CHARACTERS | ONE OR MORE WITHOUT OPPONENT CHARACTERS |
| CAPTURE CONDITION | TIME CONDITION | | TEN SECONDS | NINE SECONDS | EIGHT SECONDS | FIVE SECONDS |
| FIGHTING PARAMETER VALUE | TARGET TEAM | OFFENSIVE STRENGTH | ±0% | +1% | +2% | +3% |
| FIGHTING PARAMETER VALUE | TARGET TEAM | DEFENSIVE STRENGTH | ±0% | ±0% | ±0% | ±0% |
| FIGHTING PARAMETER VALUE | OPPO-NENT TEAM | OFFENSIVE STRENGTH | ±0% | ±0% | ±0% | ±0% |
| FIGHTING PARAMETER VALUE | OPPO-NENT TEAM | DEFENSIVE STRENGTH | ±0% | ±0% | ±0% | ±0% |

FIG.10

[CAPTURE DIFFICULTY ADJUSTMENT TABLE: ADJUSTMENT LEVEL=2]

322(322C)

| ITEM TO BE MODIFIED | | | ADJUSTMENT DEGREE | | | |
|---|---|---|---|---|---|---|
| | | | ~1 (STANDARD) | 1~2 | 2~5 | 5~ |
| CAPTURE CONDITION | CHARACTER NUMBER CONDITION | | TWO OR MORE WITHOUT OPPONENT CHARACTERS | TWO OR MORE WITHOUT OPPONENT CHARACTERS | ONE OR MORE WITHOUT OPPONENT CHARACTERS | ONE OR MORE WITHOUT OPPONENT CHARACTERS |
| | TIME CONDITION | | EIGHT SECONDS | SEVEN SECONDS | SIX SECONDS | FOUR SECONDS |
| FIGHTING PARAMETER VALUE | TARGET TEAM | OFFENSIVE STRENGTH | ±2% | +2% | +3% | +4% |
| | | DEFENSIVE STRENGTH | ±0% | ±0% | ±0% | ±0% |
| | OPPO-NENT TEAM | OFFENSIVE STRENGTH | ±0% | ±0% | ±0% | ±0% |
| | | DEFENSIVE STRENGTH | −1% | −2% | −2% | −3% |

FIG.11

320(320A)

[ADJUSTMENT DEGREE SETTING TABLE: FIRST ELEMENT]

| | DISTANCE TO OPPONENT TEAM HEADQUARTERS | FIRST ELEMENT |
|---|---|---|
| CLOSE | 0～10 | 1. 0 |
| ↑ | 10～20 | 1. 1 |
| | 20～30 | 1. 2 |
| ↓ | 40～50 | 1. 3 |
| FAR | 50～ | 1. 4 |

FIG.12

320(320B)

[ADJUSTMENT DEGREE SETTING TABLE: SECOND ELEMENT]

| | (TOTAL VALUE OF OPPONENT TEAM) −(TOTAL VALUE OF TARGET TEAM) | SECOND ELEMENT |
|---|---|---|
| SMALL | 0～2 | 1. 0 |
| ↑ | 2～4 | 1. 1 |
| | 4～6 | 1. 2 |
| ↓ | 6～8 | 1. 3 |
| LARGE | 8～ | 1. 4 |

FIG.13

320(320C)

[ADJUSTMENT DEGREE SETTING TABLE: THIRD ELEMENT]

| COMBINATION CONDITION REGARDING CHARACTERS IN TARGET TEAM | THIRD ELEMENT |
|---|---|
| THREE OR MORE OF SAME TYPE | 1. 2 |
| TWO OF MUTUALLY COMPATIBLE TYPES | 1. 2 |
| ONE OF ADVANTAGEOUS TYPE AGAINST CHARACTERS IN OPPONENT TEAM | 1. 3 |
| ⋮ | ⋮ |
| THREE OR MORE OF SAME ATTRIBUTE | 1. 1 |
| ⋮ | ⋮ |
| ONE OF COMPATIBLE ATTRIBUTE WITH INTERMEDIATE BASE ATTRIBUTE | 1. 4 |
| ⋮ | ⋮ |

FIG.14

320(320D)

[ADJUSTMENT DEGREE SETTING TABLE: FOURTH ELEMENT]

| FORMATION CONDITION REGARDING CHARACTERS IN TARGET TEAM | FOURTH ELEMENT |
|---|---|
| CLOSE-RANGE ATTACK TYPE NEAR INTERMEDIATE BASE, AND LONG-RANGE ATTACK TYPE BEHIND | 1. 5 |
| MUTUALLY CLOSE TWO OR MORE NEAR INTERMEDIATE BASE | 1. 2 |
| THREE OR MORE CLOSELY SURROUNDING INTERMEDIATE BASE | 1. 3 |
| TWO OR MORE CLOSE TO CHARACTER IN OPPONENT TEAM | 1. 2 |
| ⋮ | ⋮ |

FIG.15

320(320E)

[ADJUSTMENT DEGREE SETTING TABLE: FIFTH ELEMENT]

| NUMBER OF CAPTURED INTERMEDIATE BASES OF TARGET TEAM | FIFTH ELEMENT |
|---|---|
| ~0 | 1. 4 |
| 1 | 1. 3 |
| 2 | 1. 2 |
| 3 | 1. 1 |
| 4~ | 1. 0 |

FIG.16

320(320F)

[ADJUSTMENT DEGREE SETTING TABLE: SIXTH ELEMENT]

| ELAPSED TIME | SIXTH ELEMENT |
|---|---|
| 0 TO 10 MINUTES (IMMEDIATELY AFTER START) | 1. 0 |
| 10 TO 13 MINUTES | 1. 1 |
| 13 TO 15 MINUTES | 1. 2 |
| 15 TO 18 MINUTES | 1. 3 |
| 18 TO 20 MINUTES (NEAR END) | 1. 4 |

COMPUTER SYSTEM, GAME SYSTEM, AND EXECUTION CONTROL METHOD

CROSS REFERENCE TO RELATED APPLICATION

This application is a continuation of International Patent Application No. PCT/JP2021/021940, having an international filing date of Jun. 9, 2021, which designated the United States, the entirety of which is incorporated herein by reference. Japanese Patent Application No. 2020-133502 filed on Aug. 6, 2020 is also incorporated herein by reference in its entirety.

BACKGROUND

A well-known example of multi-play games simultaneously played by a plurality of players is a team match game fought by teams each including a plurality of players. For example, Japanese Unexamined Patent Application Publication No. 2013-198692 discloses an example of the team match game where players divided into two teams operate their player characters to sortie from bases of their own teams set in a game space to conquer the base of the opponent team, and the team that conquers the base of the opponent team first wins.

A problem in the team match game lies in that, in a one-sided game, an inferior team gives up the match or loses motivation to continue the gameplay, and thus fun in the match game is spoiled. Therefore, there is a need for a system, in the one-sided game, to provide the inferior team with some sort of opportunity to break through a disadvantageous situation while maintaining an advantageous situation of the opponent team so as not to spoil fun in the match game.

Another problem is that the game sometimes comes to a deadlock when offense and defense of both teams are balanced. In such a case, a system for changing the situation is needed, even if it is temporary, to make the match exciting.

BRIEF DESCRIPTION OF THE DRAWINGS

FIG. 7 is an example of an adjustment level setting table.

FIG. 8 is an example of a capture difficulty adjustment table.

FIG. 9 is an example of a capture difficulty adjustment table.

FIG. 10 is an example of a capture difficulty adjustment table.

FIG. 11 is an example of an adjustment degree setting table.

FIG. 12 is an example of an adjustment degree setting table.

FIG. 13 is an example of an adjustment degree setting table.

FIG. 14 is an example of an adjustment degree setting table.

FIG. 15 is an example of an adjustment degree setting table.

FIG. 16 is an example of an adjustment degree setting table.

DESCRIPTION OF EXEMPLARY EMBODIMENTS

Figure 1:
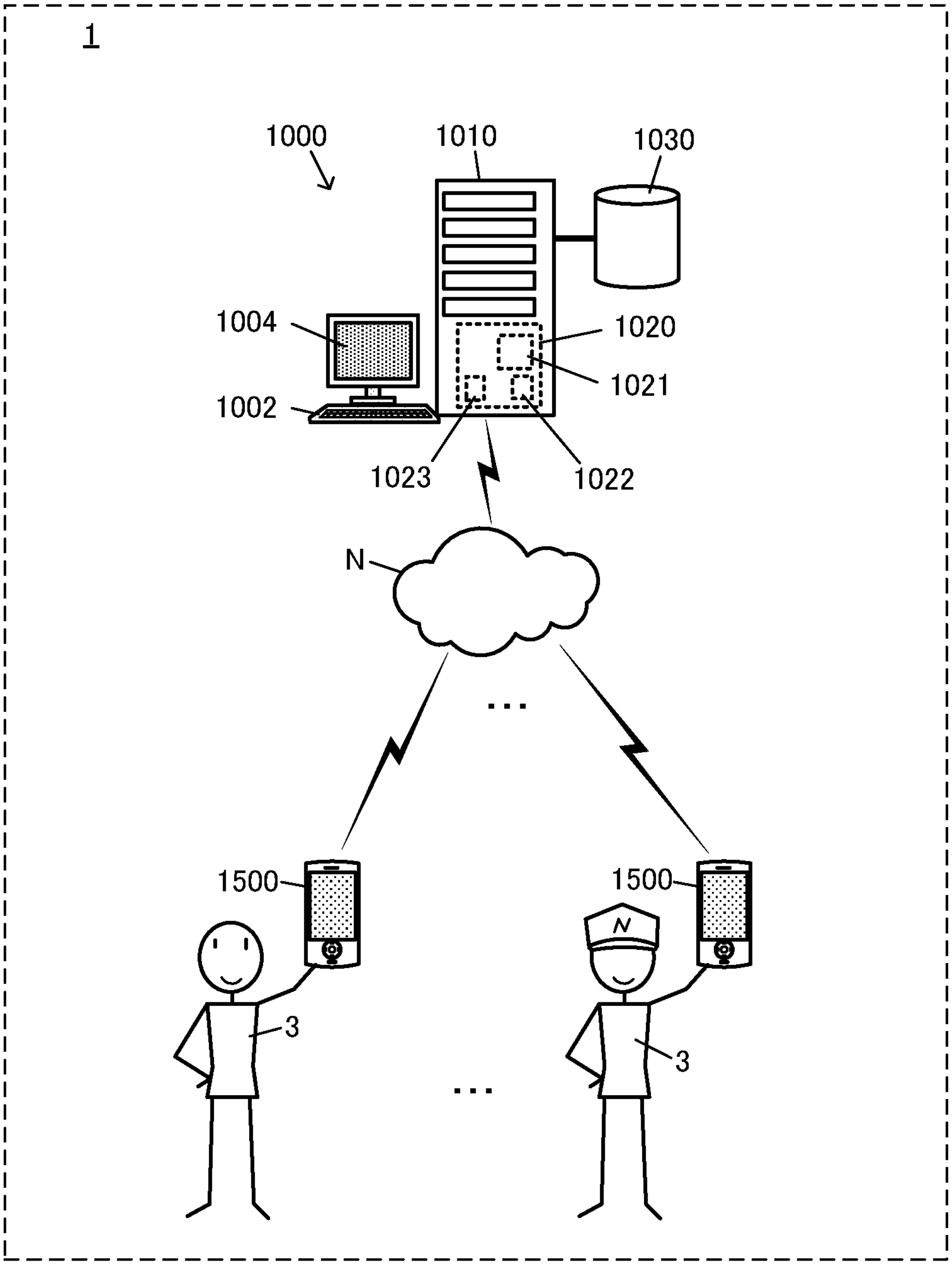
FIG. 1 is an example of a configuration of a game system.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

In accordance with one of some embodiments, there is provided a computer system comprising: at least one processor or circuit programmed to execute: setting a first team headquarters of a first team, a second team headquarters of a second team, and at least one intermediate base that either of the teams can alternately capture to use as a base in a game space; controlling display of a first gauge whose gauge value increases or decreases in accordance with at least one of a headquarters parameter value of the first team and game progress status of the first team, and a second gauge whose gauge value increases or decreases in accordance with at least one of a headquarters parameter value of the second team and game progress status of the second team; and controlling adjustment of capture difficulty of the intermediate base based on the gauge value of the first gauge and the gauge value of the second gauge.

According to the disclosure, in some embodiments, a system for changing a situation can be provided in a team match game. For example, superiority or inferiority of each of the teams can be determined based on a conquered degree in the relevant game indicated by the gauge value that increases or decreases in accordance with the headquarters parameter value or the game progress status of each of the teams. Accordingly, the capture difficulty of the intermediate base can be adjusted to make the capture easier for the team determined to be inferior. As a result, the capture of the intermediate base by the inferior team can be assisted. That is, a system for giving an opportunity allowing the inferior team to break through a disadvantageous situation can be provided. Furthermore, since the capture difficulty of the intermediate base is adjusted instead of the headquarters of an opponent team that should be conquered, the capture of the intermediate base can be made easier for the inferior team while an advantageous situation of the opponent team is maintained. As a result, it is possible to indirectly assist the inferior team to conquer the headquarters of the opponent team by using the captured intermediate base as a foothold.

In accordance with the second disclosure, the intermediate base may be disposed at a position reachable by a shorter distance than a distance to reach the headquarters of the second team as seen from the headquarters of the first team and also reachable by a shorter distance than a distance to reach the headquarters of the first team as seen from the headquarters of the second team.

According to the disclosure, in some embodiments, since the intermediate base is disposed closer than the headquarters of the opponent team as seen from the headquarters of each of the teams, the inferior team can capture the intermediate base disposed closer to the headquarters of the opponent team compared with the headquarters of an own team to turn it into a base of the own team to use it to conquer the headquarters of the opponent team.

In accordance with the third disclosure, controlling the adjustment of the capture difficulty may include modifying the capture difficulty based on a difference between the gauge value of the first gauge and the gauge value of the second gauge.

According to the disclosure, in some embodiments, an inferior degree can be determined based on the difference between the gauge values of the respective teams, and the capture difficulty can be modified in accordance with the inferior degree. For example, a modification degree of the capture difficulty can be increased as the inferior degree increases so as to make the capture of the intermediate base easier.

In accordance with the fourth disclosure, controlling the adjustment of the capture difficulty may include adjusting the capture difficulty by modifying at least one of a fighting parameter value of a team capturing the intermediate base and a fighting parameter value of a team not capturing the intermediate base.

According to the disclosure, in some embodiments, the capture difficulty of the intermediate base can be adjusted by modifying the fighting parameter value of the team. For example, by modifying the fighting parameter value of each of the teams to become relatively closer to each other, the capture difficulty of the intermediate base is consequently adjusted to make the capture easier for the inferior team.

In accordance with the fifth disclosure, controlling the adjustment of the capture difficulty may include adjusting the capture difficulty by modifying a fighting parameter value of a given character in the team not capturing the intermediate base.

According to the disclosure, in some embodiments, by modifying the fighting parameter value of the character in the team not capturing the intermediate base to increase, for example, the capture difficulty of the intermediate base is consequently adjusted to make the capture easier for this team.

In accordance with the sixth disclosure, controlling the adjustment of the capture difficulty may include adjusting the capture difficulty by modifying a given capture condition for capturing the intermediate base.

According to the disclosure, in some embodiments, the capture difficulty can be adjusted by modifying the capture condition of the intermediate base. For example, by modifying the capture condition to be eased, the capture difficulty can be adjusted to decrease, and by modifying the capture condition to be tightened, the capture difficulty can be adjusted to increase.

In accordance with the seventh disclosure, controlling the adjustment of the capture difficulty may include variably controlling an adjustment degree for adjusting the capture difficulty.

According to the disclosure, in some embodiments, the adjustment degree for adjusting the capture difficulty of the intermediate base can be variably controlled. As a result, for example, the capture difficulty can be adjusted meticulously in accordance with the inferior degree of the inferior team.

In accordance with the eighth disclosure, the at least one intermediate base may include a plurality of intermediate bases disposed in the game space, and variably controlling the adjustment degree includes modifying the adjustment degree related to each of the plurality of intermediate bases based on a disposed position of the each intermediate base in the game space.

According to the disclosure, in some embodiments, the adjustment degree of the capture difficulty of the intermediate base can be modified based on the disposed position of the intermediate base in the game space.

In accordance with the ninth disclosure, variably controlling the adjustment degree may include reducing the adjustment degree related to the intermediate base disposed in a relatively short distance to reach the headquarters of either of the first team and the second team, compared with the adjustment degree related to the intermediate base disposed in a relatively long distance.

According to the disclosure, in some embodiments, as an example of the modification of the adjustment degree of the capture difficulty of the intermediate base based on the disposed position of the intermediate base in the game space, it is possible to reduce the adjustment degree of the capture difficulty related to the intermediate base disposed in the relatively short distance to reach the headquarters of either of the teams. Accordingly, capturing the intermediate base closer to the headquarters of the opponent team becomes harder than capturing the intermediate base farther from the headquarters of the opponent team. As a result, easy reduction in the difficulty in conquering the opponent team can be prevented for both of the teams.

In accordance with the tenth disclosure, variably controlling the adjustment degree may include modifying the adjustment degree based on characteristics of a character in the first team and characteristics of a character in the second team, and the characteristics are any of a type, level, rarity value, attribute, and fighting ability value of the character.

According to the disclosure, in some embodiments, the adjustment degree of the capture difficulty of the intermediate base can be modified based on the characteristics of the character in each of the teams.

In accordance with the eleventh disclosure, variably controlling the adjustment degree may include modifying the adjustment degree based on a total value of the first team based on the characteristics of characters in the first team and a total value of the second team based on the characteristics of characters in the second team.

According to the disclosure, in some embodiments, as an example based on the characteristics of the characters in each of the teams, the adjustment degree of the capture difficulty of the intermediate base can be modified based on a difference between the total values of the teams based on the characteristics of the characters in the respective teams. As a result, the difference between the total values of the teams can be considered as the inferior degree, and the capture difficulty of the intermediate base can be adjusted in accordance with the inferior degree.

In accordance with the twelfth disclosure, variably controlling the adjustment degree may include modifying the adjustment degree based on a combination of characters in the first team and a combination of characters in the second team.

According to the disclosure, in some embodiments, the adjustment degree of the capture difficulty of the intermediate base can be modified based on the combination of the characters in each of the teams. For example, when a specific combination of the characters is included in the characters in the inferior team, the adjustment degree of the capture difficulty can be increased. The combination of the characters is, for example, a combination based on the characteristics such as that N or more characters having the same attribute are included. In such a case, for example, the adjustment degree may be modified based on a difference between a number of characters having the same attribute in the inferior team and a number of characters having the same attribute in a superior team.

In accordance with the thirteenth disclosure, variably controlling the adjustment degree may include modifying the adjustment degree based on a formation based on disposed positions of characters in the first team in the game space and a formation based on disposed positions of characters in the second team in the game space.

According to the disclosure, in some embodiments, the adjustment degree of the capture difficulty of the intermediate base can be modified based on the formation based on the disposed positions of the characters in each of the teams in the game space. For example, when the disposed positions of the characters in the inferior team is in a specific formation, the modification degree of the capture difficulty can be increased. The formation of the characters is, for example, a formation such as a cruciform arrangement or a liner arrangement.

In accordance with the fourteenth disclosure, variably controlling the adjustment degree may include modifying the adjustment degree based on progress status of a game.

According to the disclosure, in some embodiments, the adjustment degree of the capture difficulty of the intermediate base can be modified based on the progress status of the game.

In accordance with the fifteenth disclosure, the at least one intermediate base may include a plurality of intermediate bases disposed in the game space, and variably controlling the adjustment degree includes modifying the adjustment degree based on capture status of the plurality of intermediate bases of each of the teams.

According to the disclosure, in some embodiments, as an example of the modification of the adjustment degree of the capture difficulty of the intermediate base based on the progress status of the game, the adjustment degree can be modified based on the capture status of the intermediate bases of each of the teams. Accordingly, for example, the adjustment degree can be increased as a number of intermediate bases captured by the inferior team decreases. As a result, the capture of the intermediate base can be made easier for the inferior team, and thus the conquest of the opponent team can be assisted.

In accordance with the sixteenth disclosure, variably controlling the adjustment degree may include modifying the adjustment degree based on an elapsed time of the game.

According to the disclosure, in some embodiments, as an example of the modification of the adjustment degree of the capture difficulty of the intermediate base based on the progress status of the game, the adjustment degree can be modified based on the elapsed time of the game. Accordingly, for example, the adjustment degree can be increased as the elapsed time of the game extends longer. As a result, it is possible to provide the inferior team with an opportunity to break through a disadvantageous situation in an instant just before an end of the game to maintain a sense of tension in the game to the end.

In accordance with the seventeenth disclosure, a game system may comprise: a server system that is the computer system; and an operation terminal used for gameplay by each player who operates a character that belongs to a team.

According to the disclosure, in some embodiments, the game system that achieves the same effects as the computer system described above can be implemented.

In accordance with one of some embodiments, there is provided an execution control method by a computer system for controlling execution of: setting a first team headquarters of a first team, a second team headquarters of a second team, and at least one intermediate base that either of the teams can alternately capture to use as a base in a game space; controlling display of a first gauge whose gauge value increases or decreases in accordance with at least one of a headquarters parameter value of the first team and game progress status of the first team, and a second gauge whose gauge value increases or decreases in accordance with at least one of a headquarters parameter value of the second team and game progress status of the second team; and controlling adjustment of capture difficulty of the intermediate base based on the gauge value of the first gauge and the gauge value of the second gauge.

According to the disclosure, in some embodiments, the execution control method that achieves the same effects as the computer system described above can be implemented.

Exemplary embodiments are described below. Note that the following exemplary embodiments do not in any way limit the scope of the content defined by the claims laid out herein. Note also that all of the elements described in the present embodiment should not necessarily be taken as essential elements.

Preferred embodiments of the present disclosure are hereinafter described referring to the drawings. However, the present disclosure is not limited by the following embodiments, and the modes to which the present disclosure is applicable are not limited to the following embodiments. In addition, identical referential numerals are given to identical components in the drawings.

[Game System]

FIG. 1 is a diagram illustrating an example of a configuration of a game system according to the present embodiment. Referring to FIG. 1, a game system 1 according to the present embodiment includes a server system 1000 connectable to a communication network N, and a plurality of operation terminals 1500 that can access the server system 1000 via the communication network N to communicate with the server system 1000.

The communication network N is a communication channel that enables data communication. Specifically, the communication network N includes a communication network such as a local area network (LAN) using a private line (private cable) for direct connection, Ethernet (registered trademark), or the like, a telecommunication network, a cable network, and the Internet. A communication method may be a cable communication method or a wireless communication method.

The server system 1000 is a computer system including a main body device 1010, a keyboard 1002, a display 1004, and a storage 1030, and a control board 1020 is mounted in the main body device 1010.

The control board 1020 includes various processors such as a central processing unit (CPU) 1021, a graphics processing unit (GPU), and a digital signal processor (DSP), various IC memories 1022 such as VRAM, RAM, and ROM, and a communication device 1023. The control board 1020 may be implemented partially or entirely by an application specific integrated circuit (ASIC), a field-programmable gate array (FPGA), or a system on a chip (SoC). These arithmetic circuits can also be said to be processors. The server system 1000 implements various services for managing the game of the present embodiment by the control board 1020 performing calculation processes based on predetermined programs and data. For example, the server system 1000 implements a player management function related to player registration and a game management function to manage execution control of the game on the operation terminals 1500. That is, the game according to the present embodiment is implemented as a kind of client-server online game.

The server system 1000 is not limited to a single server configuration as illustrated in FIG. 1, and may be configured such that a plurality of blade servers sharing functions are connected via an internal bus to perform data communication. Furthermore, a plurality of independent servers disposed in separate locations may perform data communication with each other via a communication line to function as the server system 1000 as a whole.

Each of the operation terminals 1500 is a computer system individually used by a player 3 for gameplay, and is an electronic device that can access the server system 1000 via the communication network N. The operation terminal 1500 according to the present embodiment is described as a device called as a smartphone as hardware. However, the operation terminal 1500 may also be a portable game device, a game controller, a personal computer, a tablet computer, a wearable computer, or the like. The operation terminal 1500 is not limited to a single device as illustrated in FIG. 1, and may be configured by a plurality of devices to integrally function in cooperation.

[Game Description]

An online game provided in the game system 1 is a team match game where a plurality of players 3 are divided into teams and each of the plurality of players 3 operates a player character in a game space to fight by teams.

Figure 2:
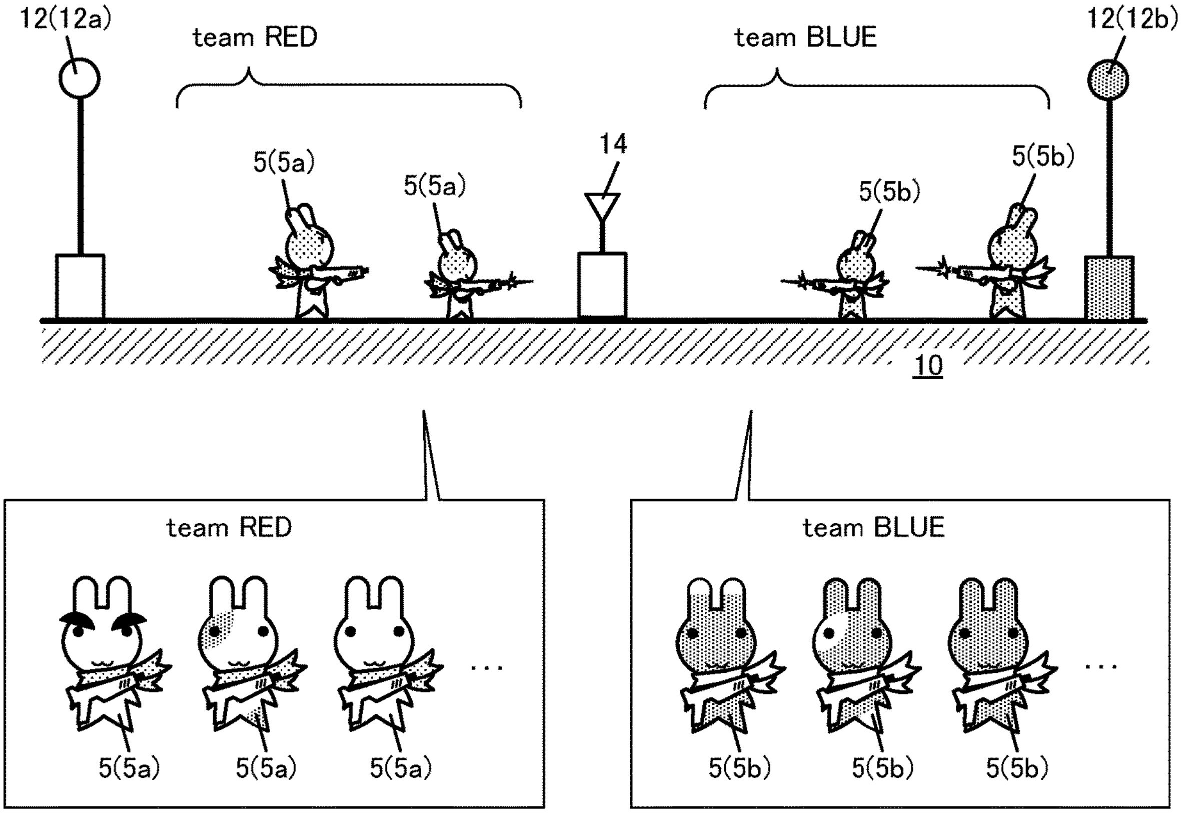
FIG. 2 is a diagram illustrating an outline of a game.

FIG. 2 is a schematic diagram illustrating the team match game according to the present embodiment. In the game according to the present embodiment, the plurality of players 3 are divided into two teams including a first team (named "team RED") that advances from left to right in a game field 10 in FIG. 2 and a second team (named "team BLUE") that advances from right to left, and each of the plurality of plays 3 fights using a soldier character as his/her player character 5.

The game field 10 includes headquarters 12 of the respective teams and at least one intermediate base 14 set on a variety of geographical features formed in the game space. The headquarters 12 are initial bases fixed to belong to the respective teams since a start of the game, and one or more headquarters are set for each of the teams. According to the present embodiment, a first team headquarters 12*a* that is the headquarters 12 of the first team and a second team headquarters 12*b* that is the headquarters 12 of the second team are set. The intermediate base 14 is a neutral base that does not belong to either of the teams at the stat of the game, and can be used as a base of an own team once either of the teams captures it. Each of the characters 5 is spawned at the headquarters 12 of its own team and sorties at the start of the match. Then, the team advances capturing a plurality of intermediate bases 14 scattered between the headquarters 12, and the team that conquers the headquarters 12 of the opponent team first wins. Furthermore, a limited time period is set for this game. If neither of the teams is able to conquer the headquarters 12 of the opponent team by the end of the limited time period, the team with a higher gauge value wins.

Figure 3:
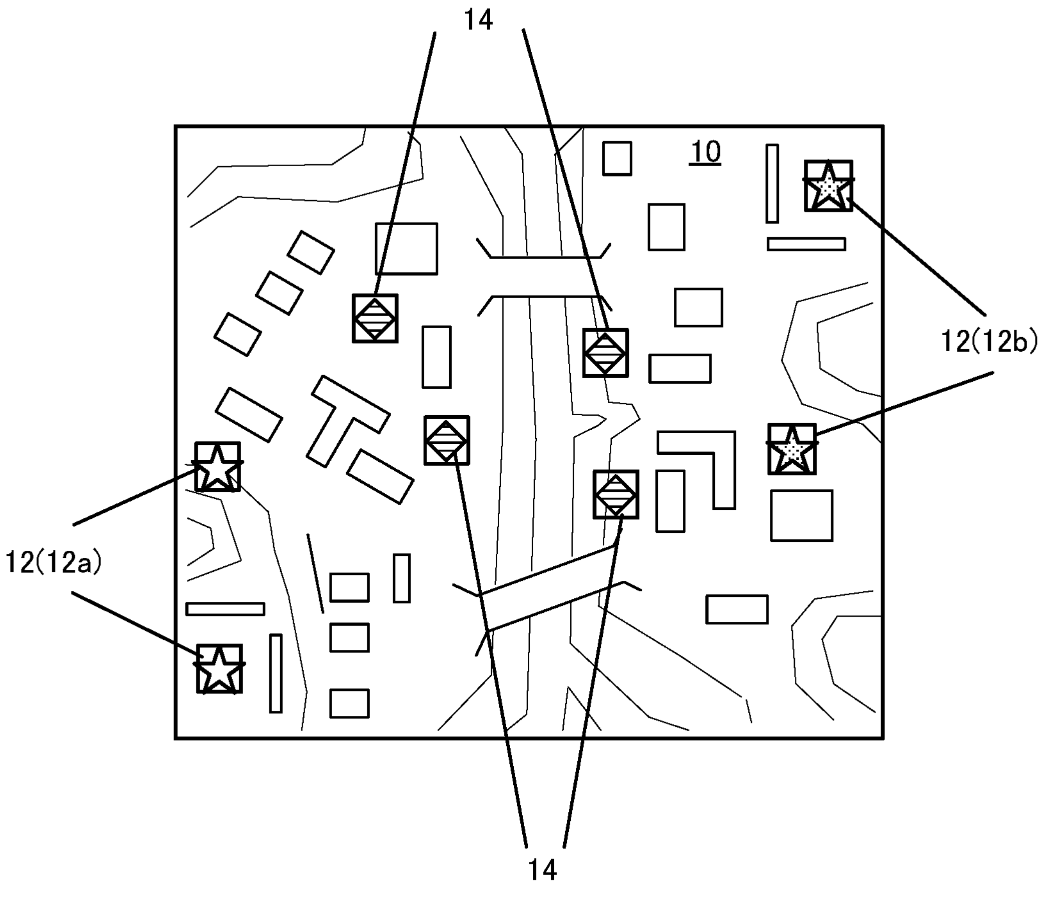
FIG. 3 is an example of a game map.

FIG. 3 is an example of a game map set as the game field 10. According to the present embodiment, there are prepared game maps including a variety of geographical features such as a desert, a mountain area, a castle, or outer space. The main objective of the game is conquest of the headquarters 12 of the opponent team in the game map regardless of the geographical features. Therefore, basically, the headquarters 12 of the respective teams are set at positions separated far away from each other, and the plurality of intermediate bases 14 are set to be scattered between the headquarters 12 of the respective teams. That is, each of the plurality of intermediate bases 14 is set at a position reachable by a distance shorter than a distance to reach the headquarters 12 of the opponent team when seen from the headquarters 12 of each of the teams. In the example in FIG. 3, the headquarters 12*a* of the first team (first team headquarters) is set on a left side in FIG. 3, while the headquarters of the second team 12*b* (second team headquarters) is set on a right side. Furthermore, the plurality of intermediate bases 14 are set to be scattered in a central area between the first team headquarters 12*a* and the second team headquarters 12*b*.

At the start of the match, the characters 5 of the respective teams are spawned at the headquarters 12 of the respective teams, and all the intermediate bases 14 are in a neutral state and do not belong to either of the teams. Once the match starts, each of the teams can capture the intermediate bases 14 to turn them into bases that belong to the own team. The characters 5 in the respective teams can use the intermediate bases 14 that belong to the own team (that has been captured by the own team) as sortie bases for restoring hit points or setting the bases as respawn positions after the characters 5 become unable to fight, or defense bases for defending against conquest of the headquarters 12 of the own team by the opponent team. Accordingly, the progress of the match can drastically change depending on a number of intermediate bases 14 that the team captures or which intermediate base 14 the team captures. Thus, capturing the intermediate bases 14 is one of keys to advantageously advance the game.

Figure 4:
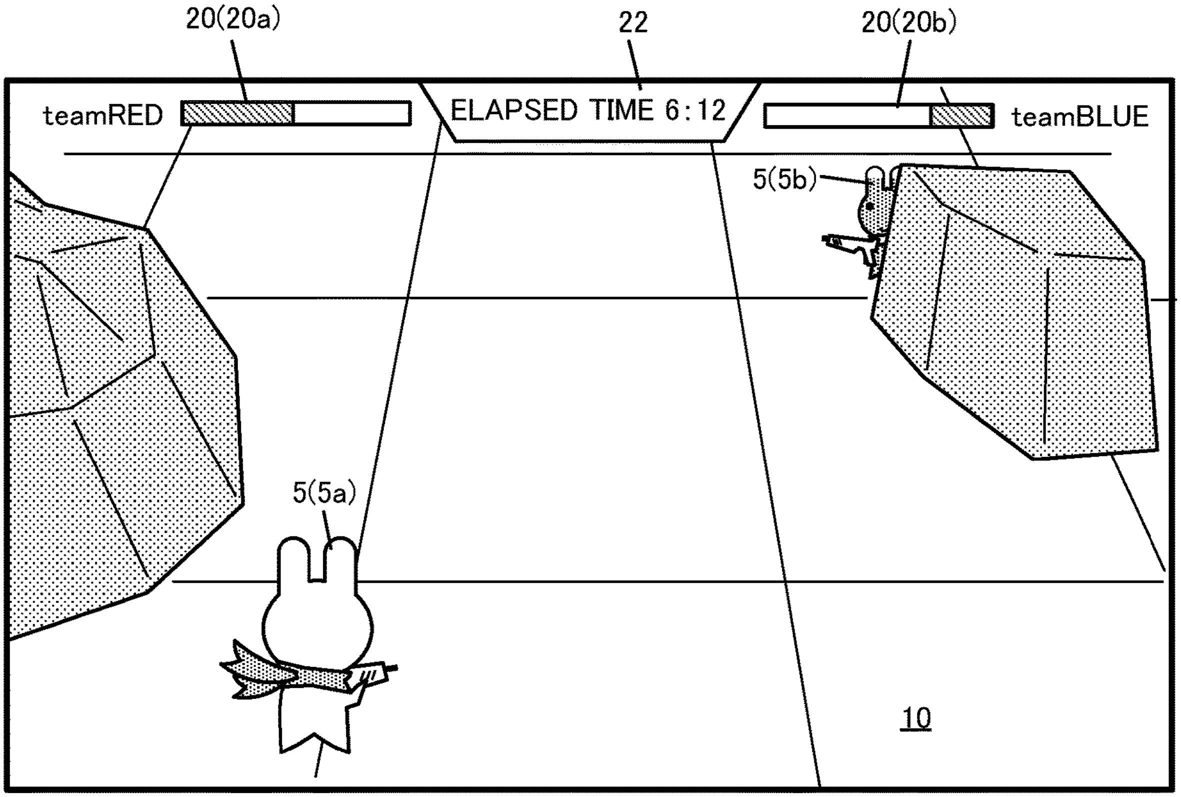
FIG. 4 is an example of a game screen.

FIG. 4 is an example of a game screen displayed on the operation terminal 1500 of the player 3 during the game. The game screen is displayed as a screen combining an image of the game field 10 seen from a virtual camera set to follow the character 5 operated by the player 3, and various types of information related to the game such as a headquarters gauge 20 whose gauge value increases or decreases in accordance with a headquarters parameter value indicating a conquered degree of the headquarters 12 of each of the teams or an elapsed time 22 since the start of the game. In addition, a radar screen or the like indicating an overview of the positions of the bases and characters 5 in the respective teams may be displayed on an outline map of the game field 10.

The headquarters gauge 20 displays the gauge value of the headquarters parameter value as a percentage. A left end of a left gauge is set to 0% and a right end is set to 100%, while a right end of a right gauge is set to 0% and a left end is set to 100%. The headquarters parameter value is set to a predetermined value (100%) at the start of the game, and decreases by receiving attacks from the characters 5 of the opponent team during the game up to zero (0%), at which point the headquarters 12 is conquered by the opponent team. In the example in FIG. 4, the headquarters gauge 20 includes a first headquarters gauge 20*a* of the first team displayed on an upper left side of the screen and a second headquarters gauge 20*b* of the second team on a right side.

Furthermore, according to the present embodiment, the gauge value is described to increase or decrease in accordance with the headquarters parameter value of the relevant team. However, the gauge value may increase or decrease in accordance with the headquarters parameter value of the opponent team. In such a case, the gauge value displays a value indicating how much the relevant team has conquered the opponent team, that is, game progress status of the relevant team.

Furthermore, since the game according to the present embodiment is set with a limited time period, a remaining time to the end of the game may be displayed as the elapsed time 22.

The plurality of intermediate bases 14 set in the game field 10 are the neutral bases that do not belong to either of the teams at the start of the game, and can be used as the bases of the own team when either of the teams captures them.

Figure 5:
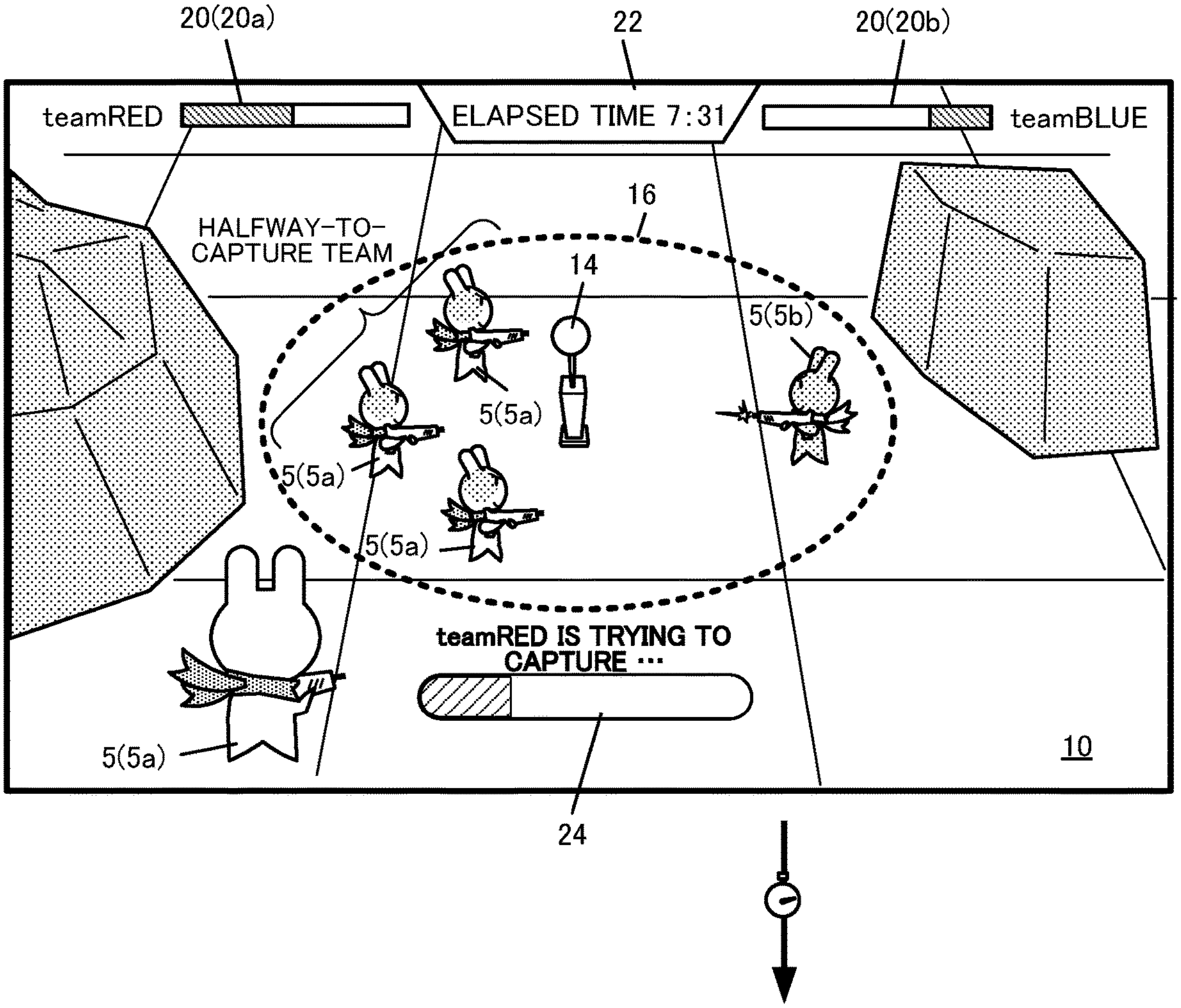
FIG. 5 is a diagram illustrating capture of an intermediate base.

FIG. 5 is a diagram illustrating capture of the intermediate base 14. The intermediate base 14 can be captured by satisfying a predetermined capture condition. The capture condition of the intermediate base 14 according to the present embodiment is that a character number condition related to a number of characters of each of the teams positioned in a predetermined capture area 16 defined in the intermediate base 14 is satisfied and a predetermined time passes while the character number condition is being satisfied (time condition). The character number condition is defined as a condition of a relative number of characters of the own team with respect to a number of characters of the opponent team, or an absolute number of the characters of the own team. For example, the character number condition is defined as a condition such as that the number of characters of the own team is larger than the number of characters of the opponent team by two or more, or that three or more characters of the own team are in the area while no character of the opponent team is. The time condition is defined as a condition of a predetermined time for about a several seconds to a several tens of seconds, such as ten seconds.

FIG. 5 illustrates a game screen showing a state where the first team is trying to capture the intermediate base 14, including a capture gauge 24. The capture gauge 24 is a gauge indicating a capture degree of the team (hereinafter referred to as a "halfway-to-capture team") trying to capture the intermediate base 14. The capture gauge 24 indicates how much of the time condition is satisfied by a gauge value that increases in accordance with the elapsed time while the character number condition is being satisfied. A left end of the capture gauge in FIG. 5 is a count start point of the predetermined time of the time condition and a right end is an end point of the predetermined time of the time condition. Accordingly, the capture gauge 24 is displayed when one of the teams satisfies the character number condition included in the capture condition and is regarded as the halfway-to-capture team trying to capture the intermediate base 14. Then, the gauge value of the capture gauge 24 increases in accordance with the elapsed time while the halfway-to-capture team is satisfying the character number condition.

FIG. 5 illustrates the state where the first team is trying to capture the intermediate base 14. That is, as for the number of characters positioned in the capture area 16 of the intermediate base 14, the number of characters 5 of the first team (three in FIG. 5) is larger than the number of characters 5 of the second team (one in FIG. 5), which is a satisfied state of the character number condition. In addition, the elapsed time while the first team is satisfying the character number condition is indicated by the gauge value of the capture gauge 24. The players 3 in the halfway-to-capture team prevents the characters 5 of the opponent team from getting into the capture area 16 to maintain the satisfied state of the character number condition, and try to maintain the current state until the time condition is satisfied.

Figure 6:
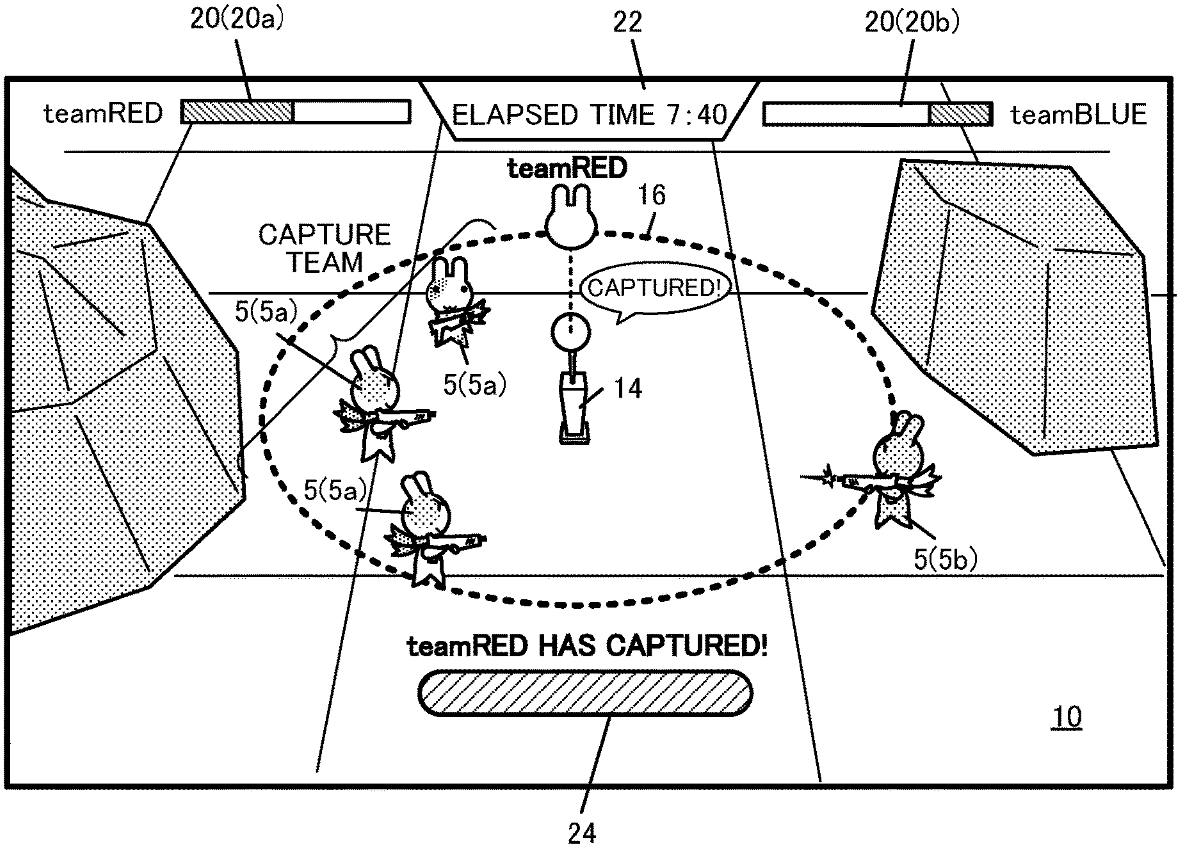
FIG. 6 is a diagram illustrating capture of an intermediate base.

Then, as illustrated in FIG. 6, once the halfway-to-capture team satisfies the time condition by maintaining the satisfied state of the character number condition until the predetermined time has passed, the capture condition is satisfied and the halfway-to-capture team captures the intermediate base. Furthermore, the gauge value of the capture gauge 24 becomes full (100%) to indicate that the time condition is satisfied. After that, the intermediate base turns into the base belonging to the team that has captured the intermediate base, and can be used by this team as the base of the own team. Furthermore, even after one of the teams has captured the intermediate base 14, the other team can capture the intermediate base 14 by satisfying the capture condition so as to take it from the one of the teams and turn it into the base belonging to the other team.

A characteristic feature of the present embodiment is that capture difficulty of the intermediate base 14 is adjusted based on the headquarters parameter values or the gauge values of the headquarters gauges 20 of the first team and the second team. A method for adjusting the capture difficulty of the intermediate base 14 largely includes two types including modifying the capture condition and modifying a fighting parameter value of each of the teams.

Modification to ease the capture condition reduces the capture difficulty of the intermediate base 14 and thus makes the capture easier. On the contrary, modification to tighten the capture condition increases the capture difficulty of the intermediate base 14 and thus makes the capture harder. As described above, the capture condition includes the two conditions including the character number condition related to the number of characters positioned in the capture area 16 of the intermediate base 14 and the time condition related to the elapsed time while the character number condition is being satisfied. The modification of the capture condition means modifying one or both of these two conditions. For example, as for the modification to ease the capture condition, the character number condition is modified to reduce the number of characters that should be positioned in the capture area 16 of the intermediate base 14, or the time condition is modified to reduce the predetermined time that should elapse. On the contrary, as for the modification to tighten the capture condition, the character number condition is modified to increase the number of characters that should be positioned in the capture area 16 of the intermediate base 14, or the time condition is modified to extend the predetermined time that should elapse.

Furthermore, temporary modification of the fighting parameter value of each of the teams can adjust relative fighting abilities between the teams so as to adjust the capture difficulty of the intermediate base 14 for each of the teams. For example, when the fighting parameter value related to the attack of one of the teams is increased, or the fighting parameter value related to the defense of the other team is reduced, the fighting ability of the one of the teams is relatively enhanced, and thus the capture difficulty of the intermediate base 14 is reduced and the capture becomes easier for the one of the teams. On the contrary, when the fighting parameter value related to the attack of the one of the teams is reduced, or the parameter value related to the defense of the other team is increased, the fighting ability of the one of the teams is relatively reduced, and thus the capture difficulty of the intermediate base 14 is increased and the capture becomes harder for the one of the teams.

The modification of the fighting parameter value of the team is performed by modifying the fighting parameter value of each of the characters 5 in the relevant team. The fighting parameter value is a parameter value affecting offensive strength, defensive strength, or a match fought between the characters, for example. Furthermore, the modification of the fighting parameter value may be applied to all of the characters in the relevant team, a specific character such as a leader, or only characters involved in the capture of the relevant intermediate base.

According to the present embodiment, adjustment of the capture difficulty of the intermediate base 14 is performed for each of the teams. That is, the capture difficulty of the same intermediate base 14 may vary between the first team and the second team. Furthermore, the adjustment of the capture difficulty of the intermediate base 14 is performed in accordance with an adjustment level based on the headquarters parameter values or gauge values of the headquarters gauges 20 of the first team and the second team. The adjustment level is calculated in accordance with an adjustment level setting table 318, an example of which is illustrated in FIG. 7.

FIG. 7 is the example of the adjustment level setting table 318. As illustrated in FIG. 7, the adjustment level setting table 318 defines the adjustment level in association with a difference between the headquarters parameter value of the team (hereinafter referred to as a "target team") that is a target of the adjustment of the capture difficulty of the intermediate base 14 and the headquarters parameter value of the opponent team. According to the present embodiment, when the headquarters parameter value of the opponent team is higher than the headquarters parameter value of the target team, the value of the adjustment level is defined to increase, as the difference becomes larger. That is, a difference between conquered degrees of the headquarters 12 of the respective teams is considered as a degree of superiority or inferiority (advantage or disadvantage) of the match status, and as the degree that the target team is considered to be inferior becomes higher, the value of the adjustment level is defined to be higher. FIG. 7 illustrates the example based on the headquarters parameter value. However, the adjustment level can be calculated based on the gauge value of the headquarters gauge 20. This is because the gauge value of the headquarters gauge 20 corresponds to the headquarters parameter value.

The capture difficulty of the intermediate base 14 for the target team is adjusted in accordance with this adjustment level. However, an adjustment degree is also variably modified in accordance with various elements related to the respective teams and the intermediate base 14. These various elements will be described later in detail.

The adjustment of the capture difficulty of the intermediate base 14 for the target team in accordance with the adjustment level is performed in accordance with a capture difficulty adjustment table 322 defined for each adjustment level. FIGS. 8 to 10 illustrate examples of the capture difficulty adjustment tables 322. These capture difficulty adjustment tables 322 define modification content of the capture condition and the fighting parameter value of each of the teams subject to the modification. Basically, the modification content is defined to reduce the capture difficulty of the intermediate base 14 more, as the adjustment level becomes higher, that is, as the degree that the target team is considered to be inferior becomes higher. Furthermore, the modification content is meticulously adjusted according to the adjustment degree in each of the capture difficulty adjustment tables 322. Basically, the modification content is adjusted such that a modification degree becomes larger, that is, the capture difficulty of the intermediate base 14 is reduced more, as the adjustment degree becomes larger.

FIG. 8 is the example of the capture difficulty adjustment table 322A when the adjustment level is zero. FIG. 9 is the example of the capture difficulty adjustment table 322B when the adjustment level is one. FIG. 10 is the example of the capture difficulty adjustment table 322C when the adjustment level is two.

The adjustment level zero indicates the match status where the target team is not inferior to the opponent team (the target team ties with or is superior to the opponent team). Accordingly, the capture difficulty adjustment table 322A for the adjustment level zero defines that the capture condition is set to a predetermined value and the adjustment in accordance with the adjustment degree is not performed. In addition, the fighting parameter value of each of the teams are defined not to be modified. With the capture difficulty of the adjustment level zero as a standard value, the capture difficulty of the adjustment level one or higher is defined to be modified to reduce the value from the standard value.

The adjustment level one indicates the match status where the target team is slightly inferior to the opponent team. Accordingly, the capture difficulty adjustment table 322B for the adjustment level one defines that the capture difficulty is set to the capture difficulty equivalent to the capture difficulty of the adjustment level zero when the adjustment degree is small (one or smaller in the example in FIG. 9), and the capture difficulty is gradually reduced correspondingly to the increase in the adjustment degree. That is, the capture difficulty adjustment table 322B defines that the capture condition is modified to be gradually eased correspondingly to the increase in the adjustment degree from the capture condition defined in the capture difficulty adjustment table 322A for the adjustment level zero. Furthermore, the fighting parameter value is modified such that the offensive strength of the target team is gradually enhanced correspondingly to the increase in the adjustment degree, so that the relative fighting ability of the target team with respect to the fighting ability of the opponent team is gradually enhanced.

The adjustment level two indicates the match status where the target team is more inferior to the opponent team compared with the match status of the adjustment level one. Accordingly, the capture difficulty adjustment table 322C for the adjustment level two defines that the capture difficulty is set to the capture difficulty slightly reduced from the capture difficulty of the adjustment level zero when the adjustment degree is small (one or smaller in the example in FIG. 10), and the capture difficulty is gradually reduced correspondingly to the increase in the adjustment degree. That is, the capture difficulty adjustment table 322C defines that the capture condition is modified to be gradually eased correspondingly to the increase in the adjustment degree from the value obtained by slightly easing the capture condition defined in the capture difficulty adjustment table 322A for the adjustment level zero. Furthermore, the fighting parameter value is modified such that the offensive strength of the target team is gradually enhanced correspondingly to the increase in the adjustment degree, and the defensive strength of the opponent team is gradually reduced correspondingly to the increase in the adjustment degree, so that the relative fighting ability of the target team with respect to the opponent team is gradually enhanced. A degree of relative enhancement in the fighting ability of the target team is larger than a degree at the adjustment level one.

This also applies to the cases of the adjustment level three and higher, though drawings are omitted. That is, the capture difficulty adjustment table 322 for each of the adjustment levels defines that the capture difficulty is set to the capture difficulty reduced correspondingly to the adjustment level from the capture difficulty of the adjustment level zero when the adjustment degree is small (e.g., one or smaller), and the capture difficulty is gradually reduced correspondingly to the increase in the adjustment degree. Furthermore, the modification of the fighting parameter value may be defined such that the relative fighting ability of the target team with respect to the opponent team is enhanced by reducing the offensive strength of the opponent team.

The various elements that determine the adjustment degree are described hereinafter. According to the present embodiment, the adjustment degree is a multiplication value (multiplication coefficient) of respective values of six elements (first element to sixth element). The value of each of the elements is defined in accordance with an adjustment degree setting table 320, examples of which are shown in FIGS. 11 to 16. A large number portion (integer value) obtained by rounding down a decimal part of a result value of the multiplication of all multiplication values of the six elements is used as the adjustment degree of the capture difficulty adjustment table. Alternatively, instead of using all the six elements (first element to sixth element), one or some of these elements may be selected to determine the multiplication value(s) to be used to calculate the adjustment degree.

FIG. 11 is the example of the adjustment degree setting table 320A defining the value of the first element. The first element is an element based on a disposed position of the intermediate base 14 in the game space. The adjustment degree setting table 320A in FIG. 11 defines the value of the first element in association with the distance from the intermediate base 14 to the headquarters of the opponent team. According to the present embodiment, the value of the first element is defined to increase as the distance becomes longer. Although the distance from the intermediate base 14 to the headquarters of the opponent team is used in the FIG. 11, the distance from the intermediate base 14 to the headquarters of the target team may be used. That is, the adjustment degree related to the intermediate base disposed in a relatively short distance to reach the headquarters of each of the teams is reduced compared with the adjustment degree related to the intermediate base disposed in a relatively long distance.

FIG. 12 is the example of the adjustment degree setting table 320B defining the value of the second element. The second element is an element based on characteristics including any of a type, a level, a rarity value, an attribute, a fighting ability value (e.g., offensive strength and defensive strength) of each of the characters 5 in the respective teams, and is also an element based on a total value of the team based on the characteristics of each of the characters 5 in the respective teams. The adjustment degree setting table 320B in FIG. 12 defines the value of the second element in association with a difference between the total value of the opponent team and the total value of the target team. According to the present embodiment, when the total value of the opponent team is higher than the total value of the target team, the value of the second element is defined to increase, as the difference becomes larger. The total value of the team is a sum of individual ability values of the characters obtained based on the characteristics of the characters in the relevant team. The individual ability value of each of the characters is defined to increase as the level, rarity value, and fighting ability value of the characteristics becomes higher, and is also defined to increase in the case of a specific attribute compared with the cases of any other attributes.

FIG. 13 is the example of the adjustment degree setting table 320C defining the value of the third element. The third element is an element based on a combination of the characters in each of the teams. The adjustment degree setting table 320C in FIG. 13 defines the value of the third element in association with a combination condition related to the characters in the target team. The combination condition is, for example, a condition of the combination of the characters in the target team and a condition of the combination that the types or attributes of the characters should satisfy. In addition to the types and attributes indicated in FIG. 13 as examples, a condition related to the characteristics of the character such as the level, rarity value, and fighting ability value may be included. Alternatively, a condition related to the combination with the characters of the opponent team may be included. The value of the third element is a total of the values associated with the combination condition satisfied by the target team out of these combination conditions.

FIG. 14 is the example of the adjustment degree setting table 320D defining the value of the fourth element. The fourth element is an element based on a formation based on the disposed positions of the characters in each of the teams in the game space. The adjustment degree setting table 320D in FIG. 14 defines the value of the fourth element in association with a formation condition related to the disposed positions of the characters in the target team. The formation condition is a condition that the disposed positions of the plurality of characters in the target team in the game space should satisfy. For example, the formation condition is a condition of a relation of relative disposed positions of the respective characters with respect to a reference position of the target intermediate base or reference positions of the characters in the opponent team, or a relation of an absolute disposed positions among the characters. Furthermore, the formation condition may be a condition of a relation of the disposed positions that the characters satisfying a specific condition (e.g., characteristics related to strong and weak points of attack that are included in the fighting ability values, such as a close-range attack type or a long-range attack type) should satisfy. The value of the fourth element is a total of the values associated with the condition satisfied by the halfway-to-capture team out of the plurality of conditions.

FIG. 15 is the example of the adjustment degree setting table 320E defining the value of the fifth element. The fifth element is an element based on capture status of the intermediate bases of each of the teams. The capture status is an example of progress status of the game. The adjustment degree setting table 320E in FIG. 15 defines the value of the fifth element in association with a number of intermediate bases captured by the halfway-to-capture team. According to the present embodiment, the value of the fifth element is defined to increase as the number of intermediate bases captured by the halfway-to-capture team decreases. Although the number of intermediate bases captured by the halfway-to-capture team is used in FIG. 15, a number of intermediate bases captured by the opponent team may be used. In such a case, the value of the fifth element is preferably defined to increase as the number of intermediate bases captured by the opponent team increases. Alternatively, a difference or a ratio between the numbers of the intermediate bases captured by the respective teams may be used. In such a case, when the number of intermediate bases captured by the opponent team is larger than the number of intermediate bases captured by the halfway-to-capture team, the value of the fifth element is preferably defined to increase, as the difference becomes larger.

FIG. 16 is the example of the adjustment degree setting table 320F defining the value of the sixth element. The sixth element is an element based on the elapsed time of the game that is another example of the progress status of the game. The adjustment degree setting table 320F in FIG. 16 defines the value of the sixth element in association with the elapsed time from the start of the game. According to the present embodiment, the value of the sixth element is defined to increase as the elapsed time extends longer, that is, as the end of the game set with the limited time period approaches.

[Functional Configuration]

Figure 17:
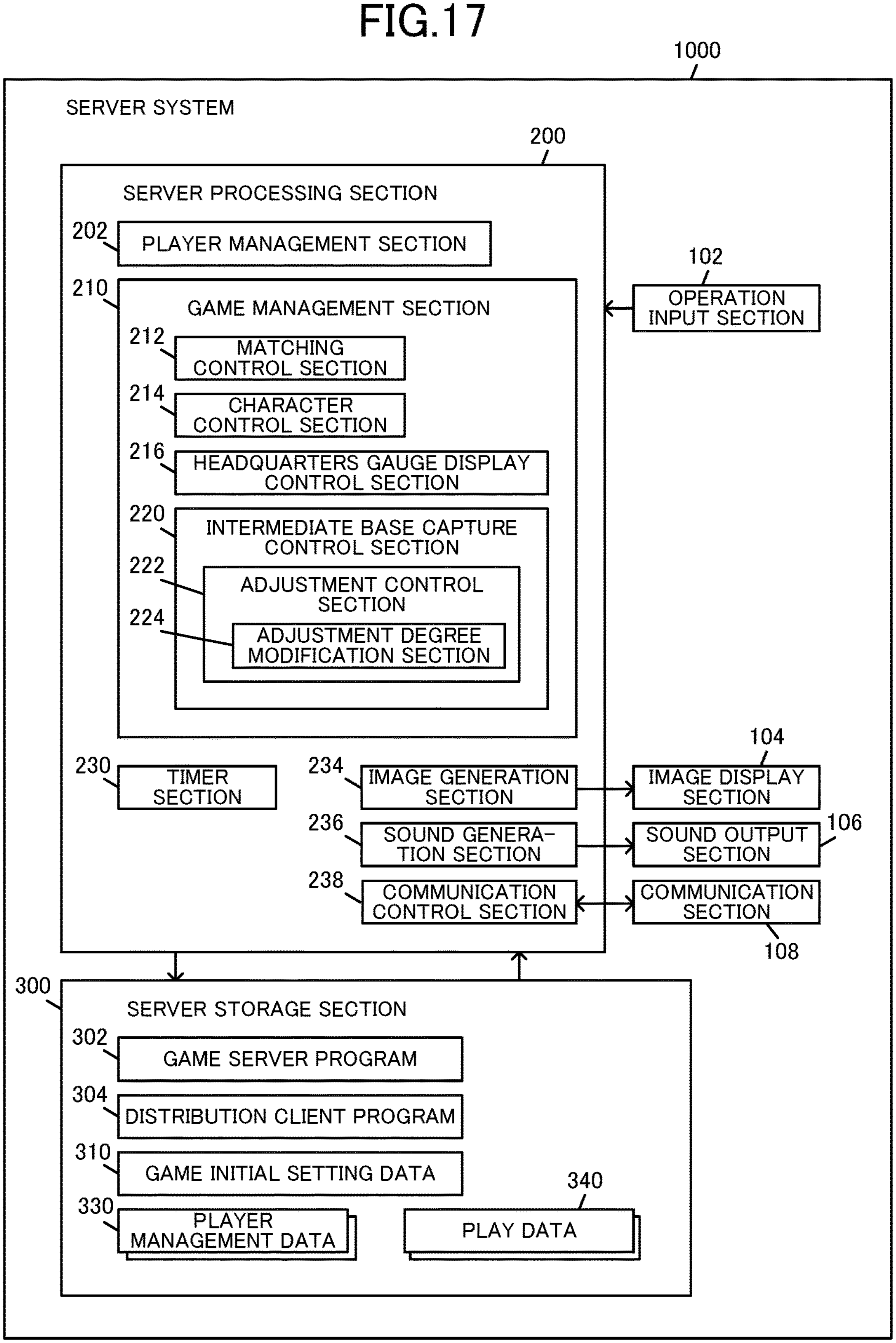
FIG. 17 is a diagram illustrating a functional configuration of a server system.

FIG. 17 is a block diagram illustrating a functional configuration of the server system 1000. According to FIG. 17, the server system 1000 includes an operation input section 102, an image display section 104, a sound output section 106, a communication section 108, a server processing section 200, and a server storage section 300.

The operation input section 102 outputs operation input signals to the server processing section 200 in response to various operation input for management of the server system 1000. The operation input section 102 corresponds to the keyboard 1002 illustrated in FIG. 1.

The server processing section 200 is implemented by, for example, a processor such as a CPU or GPU and electronic components such as an ASIC and IC memory. The server processing section 200 controls input/output of data between the functional sections including the operation input section 102 and the server storage section 300. The server processing section 200 performs various calculation processes based on predetermined programs and data, operation input signals from the operation input section 102, data received from the operation terminal 1500, or the like, so as to comprehensively control the operations of the server system 1000. The server processing section 200 corresponds to the control board 1020 illustrated in FIG. 1. The server processing section 200 also includes a player management section 202, a game management section 210, a timer section 230, an image generation section 234, a sound generation section 236, and a communication control section 238. Of course, other functions may be included as appropriate.

The player management section 202 performs various processes related to the registration management of a player 3. According to the present embodiment, the player management section 202 has the functions of providing a unique player account to a registered player, managing registration information for registering and managing personal information for each player account, managing game data, and the like. Of course, other management functions for data associated with the account can be included as appropriate. The player management section 202 assigns a unique account (player ID) to the player 3 who has gone through a player registration procedure and generates player management data 330 so as to manage the data related to each player 3.

Figure 18:
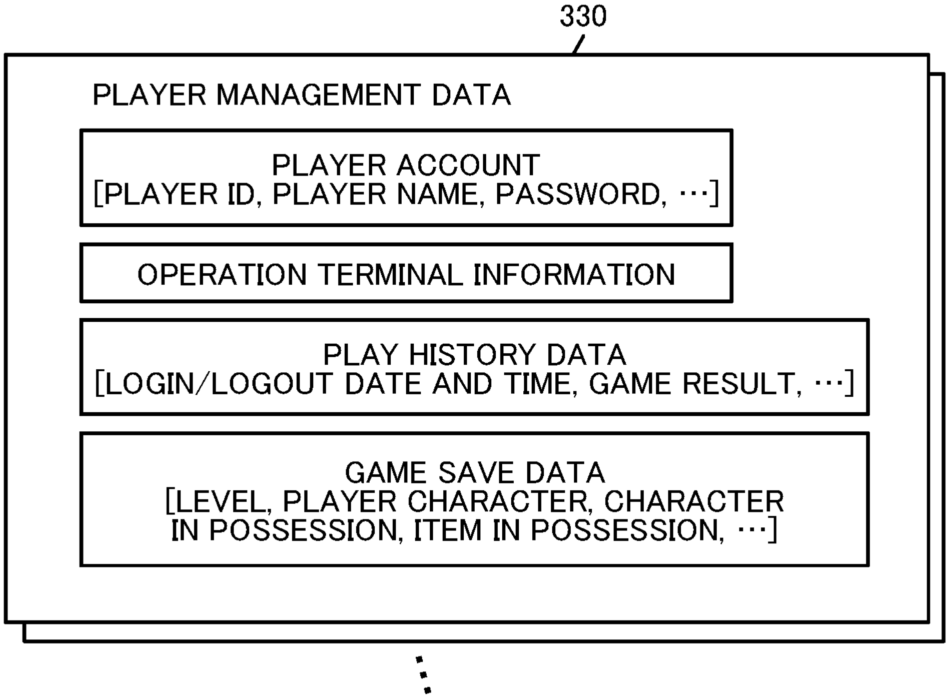
FIG. 18 is an example of player management data.

FIG. 18 is a diagram illustrating an example of the player management data 330. According to FIG. 18, the player management data 330 is generated for each registered player, and includes a player account, operation terminal information related to the operation terminal 1500 of the relevant player, play history data, and game save data. The player account includes a player name and a password for login authentication arbitrarily set by the player, as well as the unique player ID assigned to the relevant player. The play history data includes login dates and times, logout dates and times, game results, or the like. The game save data includes a player level, a player character used in the game, characters and items in possession, or the like.

The game management section 210 performs various processes related to game execution management. The game according to the present embodiment is a client-server online game, and thus the game management section 210 communicates with the operation terminal 1500 to perform control of providing data required for gameplay. According to the present embodiment, the game management section 210 sets the first team headquarters 12*a*, the second team headquarters 12*b*, and the intermediate bases 14 that either of the teams can alternately capture to use as the bases in the game space in accordance with a game server program 302. Then, the game management section 210 controls the progress of the game where the first team and the second team fight with each other in the game space and the team that conquers the headquarters 12 of the opponent team first wins. Furthermore, the game management section 210 includes a matching control section 212, a character control section 214, a headquarters gauge display control section 216, and an intermediate base capture control section 220.

The matching control section 212 performs a process related to organization of the teams to have a match by matching the players 3. The organization of the teams is implemented in a similar manner as in known team match online games.

The character control section 214 controls the player character 5 of the relevant player 3 in the game space in response to operation signals from the relevant player 3 received from the operation terminal 1500 of each player 3.

The headquarters gauge display control section 216 performs display control of the first headquarters gauge 20*a* that is a first gauge based on the gauge value of the first team and the second headquarters gauge 20*b* that is a second gauge based on the gauge value of the second team on a game screen displayed on the operation terminal 1500 of each player 3 (see FIG. 4). The first headquarters gauge 20*a* displays the gauge value that increases or decreases in accordance with the headquarters parameter value indicating a conquered degree set on the first team headquarters 12*a*, while the second headquarters gauge 20*b* displays the gauge value that increases or decreases in accordance with the headquarters parameter value indicating a conquered degree set on the second team headquarters 12*b*.

The intermediate base capture control section 220 includes an adjustment control section 222, and performs various processes related to the capture of each of the intermediate bases 14. Each of the intermediate bases 14 is disposed at a position reachable by a shorter distance than a distance to reach the headquarters 12*b* of the second team as seen from the headquarters 12*a* of the first team, and also reachable by a shorter distance than a distance to reach the headquarters 12*a* of the first team as seen from the headquarters 12*b* of the second team (see FIG. 3). In particular, the intermediate base capture control section 220 sets all the intermediate bases 14 as the neutral bases that do not belong to either of the teams at the start of the match. Then, once the match starts, the intermediate base capture control section 220 determines whether each of the teams has satisfied the capture condition for each of the intermediate bases 14, and allows the team satisfying the capture condition to have the relevant intermediate base 14. The capture condition for each of the teams to capture the intermediate base 14 is the capture condition that has been modified due to the adjustment of the capture difficulty by the adjustment control section 222.

The adjustment control section 222 includes an adjustment degree modification section 224, and controls the adjustment of the capture difficulty of the intermediate base 14 based on the headquarters parameter value or the gauge value of the headquarters gauge 20 of each of the first team and the second team. In particular, with each of the first team and the second team as the target team, the adjustment control section 222 calculates the adjustment level of the capture difficulty of the intermediate base 14 for the relevant target team in accordance with the adjustment level setting table 318. Then, the adjustment control section 222 adjusts the capture difficulty of the intermediate base for each of the teams in accordance with the capture difficulty adjustment table 322 suitable for the adjustment level. At this time, the adjustment degree control section 222 adjusts the capture difficulty by further using the adjustment degree by the adjustment degree modification section 224. Accordingly, the adjustment control section 222 modifies the capture difficulty based on the difference between the headquarters parameter value of the first team and the headquarters parameter value of the second team, or the difference between the gauge value of the headquarters gauge 20 of the first team and the gauge value of the headquarters gauge 20 of the second team. Furthermore, the adjustment control section 222 adjusts the capture difficulty by modifying the fighting parameter value of the team capturing the intermediate base 14 and/or the fighting parameter value of the team not capturing the intermediate base 14. Furthermore, the adjustment control section 222 adjusts the capture difficulty by modifying the fighting parameter value of a given character 5 in the team not capturing the intermediate base 14. Furthermore, the adjustment control section 222 adjusts the capture difficulty by modifying a given capture condition for capturing the intermediate base 14.

The adjustment degree modification section 224 variably controls the adjustment degree for adjusting the capture difficulty of the intermediate base 14. In particular, the adjustment degree modification section 224 obtains the multiplication values (multiplication coefficients) of the various elements (first element to sixth element) in accordance with the adjustment degree setting tables 320 (320A to 320F), and calculates the large number (integer value) of the result of the multiplication of these multiplication values as the adjustment degree. Accordingly, the adjustment degree modification section 224 modifies the adjustment degree related to each of the intermediate bases 14 based on the disposed positions of the plurality of intermediate bases 14 disposed in the game space. Furthermore, the adjustment degree modification section 224 reduces the adjustment degree related to the intermediate base 14 disposed in a relatively short distance to reach the headquarters of the first team or the second team, compared with the adjustment degree related to the intermediate base disposed in a relatively long distance. Furthermore, the adjustment degree modification section 224 modifies the adjustment degree based on any of the type, level, rarity value, attribute, and fighting ability value (hereinafter referred to as "characteristics" as a whole) of each of the characters in the first team and the characteristics of each of the characters in the second team. Furthermore, the adjustment degree modification section 224 modifies the adjustment degree based on the total value of the first team based on the characteristics of the characters in the first team and the total value of the second team based on the characteristics of the characters in the second team. Furthermore, the adjustment degree modification section 224 modifies the adjustment degree based on the combination of the characters in the first team and the combination of the characters in the second team. Furthermore, the adjustment degree modification section 224 modifies the adjustment degree based on the formation based on the disposed positions of the characters in the first team in the game space and the formation based on the disposed positions of the characters in the second team in the game space. Furthermore, the adjustment degree modification section 224 modifies the adjustment degree based on the progress status of the game. Furthermore, the adjustment degree modification section 224 modifies the adjustment degree based on the capture status of the plurality of intermediate bases 14 disposed in the game space of each of the teams. Furthermore, the adjustment degree modification section 224 modifies the adjustment degree based on the elapsed time of the game.

The timer section 230 uses a system clock to measure the current date and time or the like.

The image generation section 234 generates images related to the system management of the server system 1000, images to be displayed on the operation terminal 1500, or the like. Then, the image generation section 234 outputs image signals related to the system management to the image display section 104. The image display section 104 displays various images for the system management based on the image signals input from the image generation section 234. For example, the image display section 104 can be implemented by an image display device such as a flat panel display, or a projector. The image display section 104 corresponds to the display 1004 illustrated in FIG. 1.

The sound generation section 236 is implemented by an IC or software that generates sound data and performs decoding, and generates or decodes the sound data of operation sounds, BGM, or the like related to the system management of the server system 1000 and the gameplay. The sound generation section 236 outputs sound signals related to the system management to the sound output section 106. The sound output section 106 emits sounds based on the input sound signals. The sound output section corresponds to a speaker (not illustrated) included in the main body device 1010 or the display 1004 illustrated in FIG. 1.

The communication control section 238 performs data processing related to data communication, and implements data exchange with an external device through the communication section 108. The communication section 108 connects to the communication network N to implement communication. For example, the communication section 108 is implemented by a wireless communication device, a modem, a jack for wired communication cable, a control circuit, or the like. The communication section 108 corresponds to the communication device 1023 illustrated in FIG. 1.

The server storage section 300 stores programs and various types of data for implementing various functions for causing the server processing section 200 to comprehensively control the server system 1000. The server storage section 300 is used as a work area for the server processing section 200, and temporarily stores results of calculations executed by the server processing section 200 in accordance with various programs. The server storage section 300 is implemented by an IC memory such as RAM or ROM, a magnetic disk such as a hard disk, an optical disk such as a CD-ROM or a DVD, an online storage, or the like. The server storage section 300 stores a game server program 302, a distribution client program 304, game initial setting data 310 necessary for game execution control, player management data 330, and play data 340.

The game server program 302 is a program for implementing functions as a game server for the online game according to the present embodiment. The distribution client program 304 is an original of a client program 702 (see FIG. 21) that is downloaded on the operation terminal 1500.

Figure 19:
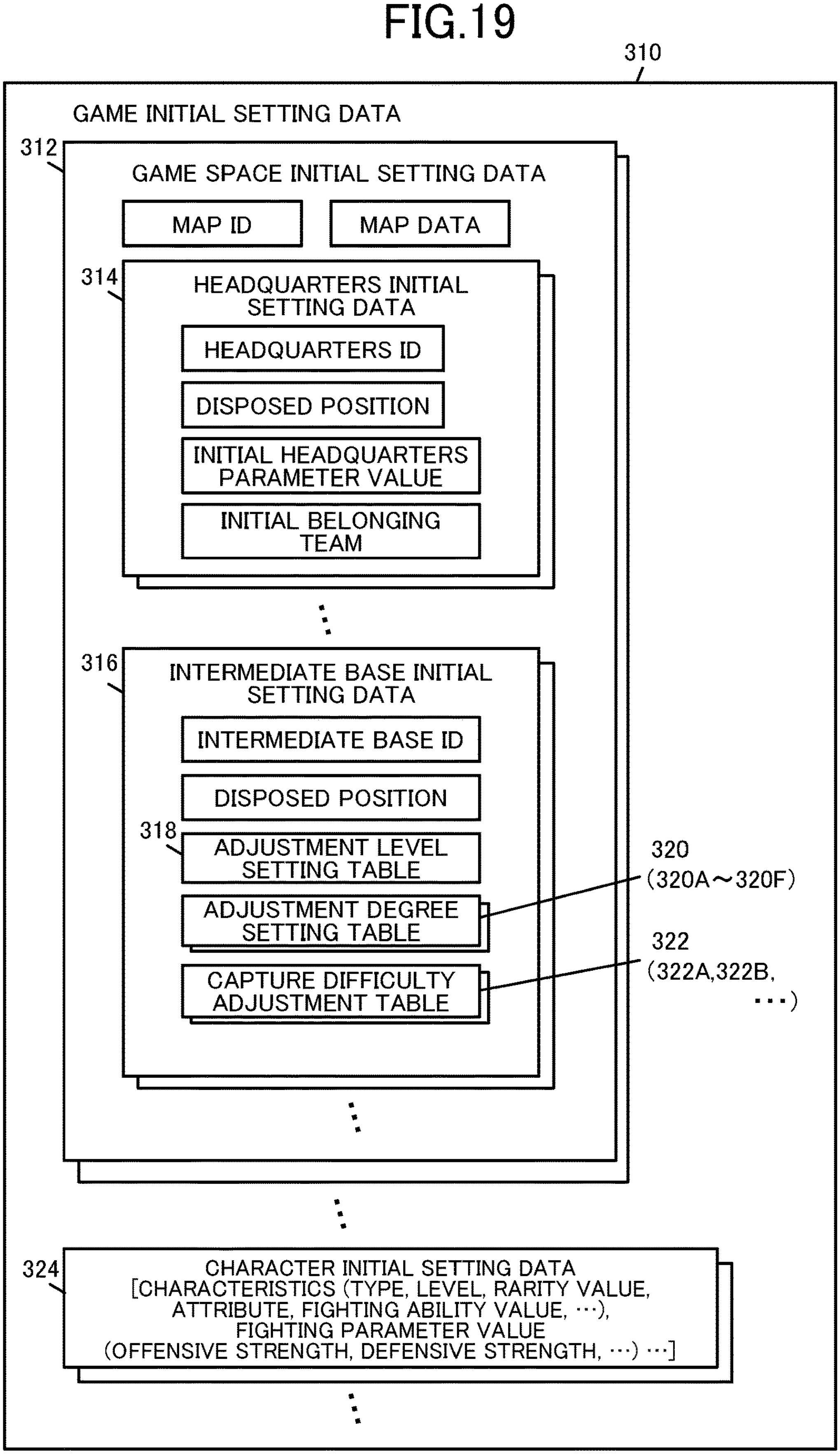
FIG. 19 is an example of game initial setting data.

FIG. 19 is a diagram illustrating an example of the game initial setting data 310. As illustrated in FIG. 19, the game initial setting data 310 includes game space initial setting data 312 and character initial setting data 324.

The game space initial setting data 312 is initial setting data related to the game field 10 built in the game space, and is generated for each type of the game field 10. The game space initial setting data 312 includes a map ID of a game map set as the relevant game field 10, map data, headquarters initial setting data 314, and intermediate base initial setting data 316. The map data is data defining the space of the game field 10, and stores definition data of geographical features, a land category, structures in the field, or the like.

The headquarters initial setting data 314 is generated for each headquarters 12 set in the game map. The headquarters initial setting data 314 stores a headquarters ID of the relevant headquarters, a disposed position in the game space, an initial headquarters parameter value, and an initial belonging team. The initial belonging team is data indicating which team the relevant headquarters 12 belongs to at the start of the match.

The intermediate base initial setting data 316 is generated for each intermediate base 14 set in the game map. The intermediate base initial setting data 316 stores an intermediate base ID of the relevant intermediate base 14, a disposed position in the game space, an adjustment level setting table 318, an adjustment degree setting table 320, and a capture difficulty adjustment table 322.

The character initial setting data 324 is initial setting data related to the characters 5 that appear in the game. The character initial setting data 324 stores, for each character, definition data of the relevant character including initial values related to the characteristics such as the type, level, rarity value, attribute, or fighting ability value, an initial value of the fighting parameter value such as the offensive strength or the defensive strength, model data, or the like.

Figure 20:
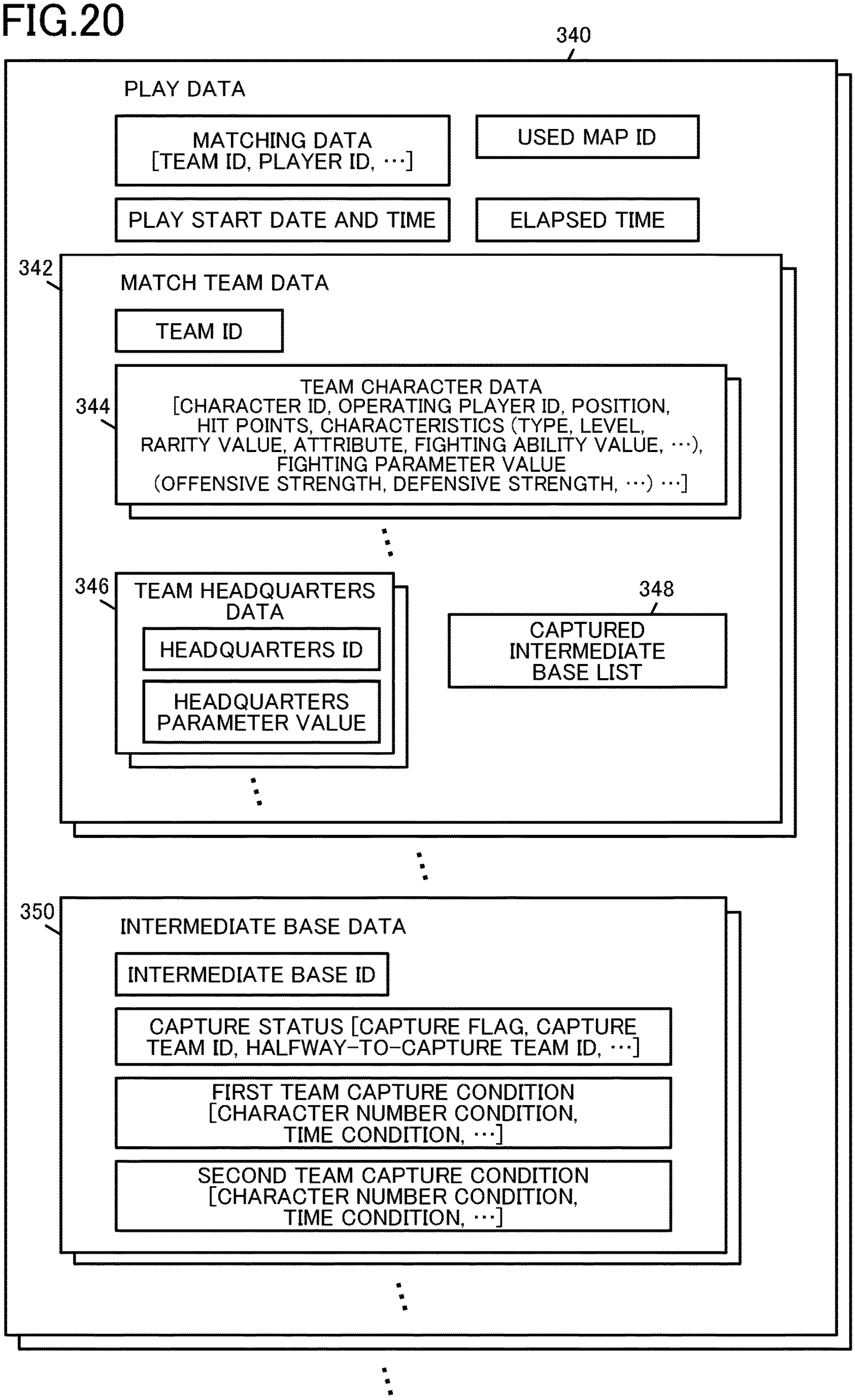
FIG. 20 is an example of play data.

FIG. 20 is a diagram illustrating an example of the play data 340. According to FIG. 20, the play data 340 is generated for each gameplay (match). The play data 340 includes various data related to the relevant gameplay including matching data, a used map ID, a play start date and time, an elapsed time from a game start, match team data 342, and intermediate base data 350. The matching data is data related to the players 3 to participate in the game, and stores player IDs of the players 3 in the relevant team in association with a team ID of each of the teams.

The match team data 342 is generated for each team to have the match in the relevant game. The match team data 342 includes a team ID of the relevant team, team character data 344, team headquarters data 346, and a captured intermediate base list 348.

The team character data 344 is data related to the characters 5 that belong to the relevant team. The team character data 344 stores, for each character, a character ID, an operating player ID of the player operating the relevant character, a position in the game space, hit points, data related to the characteristics (e.g., type, level, rarity value, attribute, and fighting ability value), and data related to the fighting parameter value (e.g., offensive strength and defensive strength).

The team headquarters data 346 is data related to the headquarters 12 of the relevant team. The team headquarters data 346 stores a headquarters ID and a headquarters parameter value of each of the headquarters 12 set to belong to the relevant team. In accordance with the headquarters parameter value, the headquarters gauge display control section 216 performs the display control by increasing or reducing the gauge value of the headquarters gauge 20 in the game screen displayed on the operation terminal 1500 of each of the players 3.

The captured intermediate base list 348 is a list of the intermediate base IDs of the intermediate bases 14 that have been captured and owned by the relevant team out of the intermediate bases set in the game field 10.

The intermediate base data 350 is generated for each intermediate base 14 set in the game map. The intermediate base data 350 stores an intermediate base ID, capture status, a first team capture condition, and a second team capture condition of the relevant intermediate base 14. The capture status stores a capture flag indicating whether the intermediate base 14 is captured by either of the teams, a capture team ID indicating the team that captures the intermediate base when the intermediate base is captured, a halfway-to-capture team ID indicating the halfway-to-capture team when capture of the intermediate base is in progress, or the like. The first team capture condition is data related to the capture condition for the first team to capture the intermediate base 14. The first team capture condition includes a character number condition and a time condition. The second team capture condition is data related to the capture condition for the second team to capture the intermediate base 14. The second team capture condition includes a character number condition and a time condition. The first team capture condition and the second team capture condition are the capture conditions that have been modified due to the adjustment of the capture difficulty by the adjustment control section 222.

Figure 21:
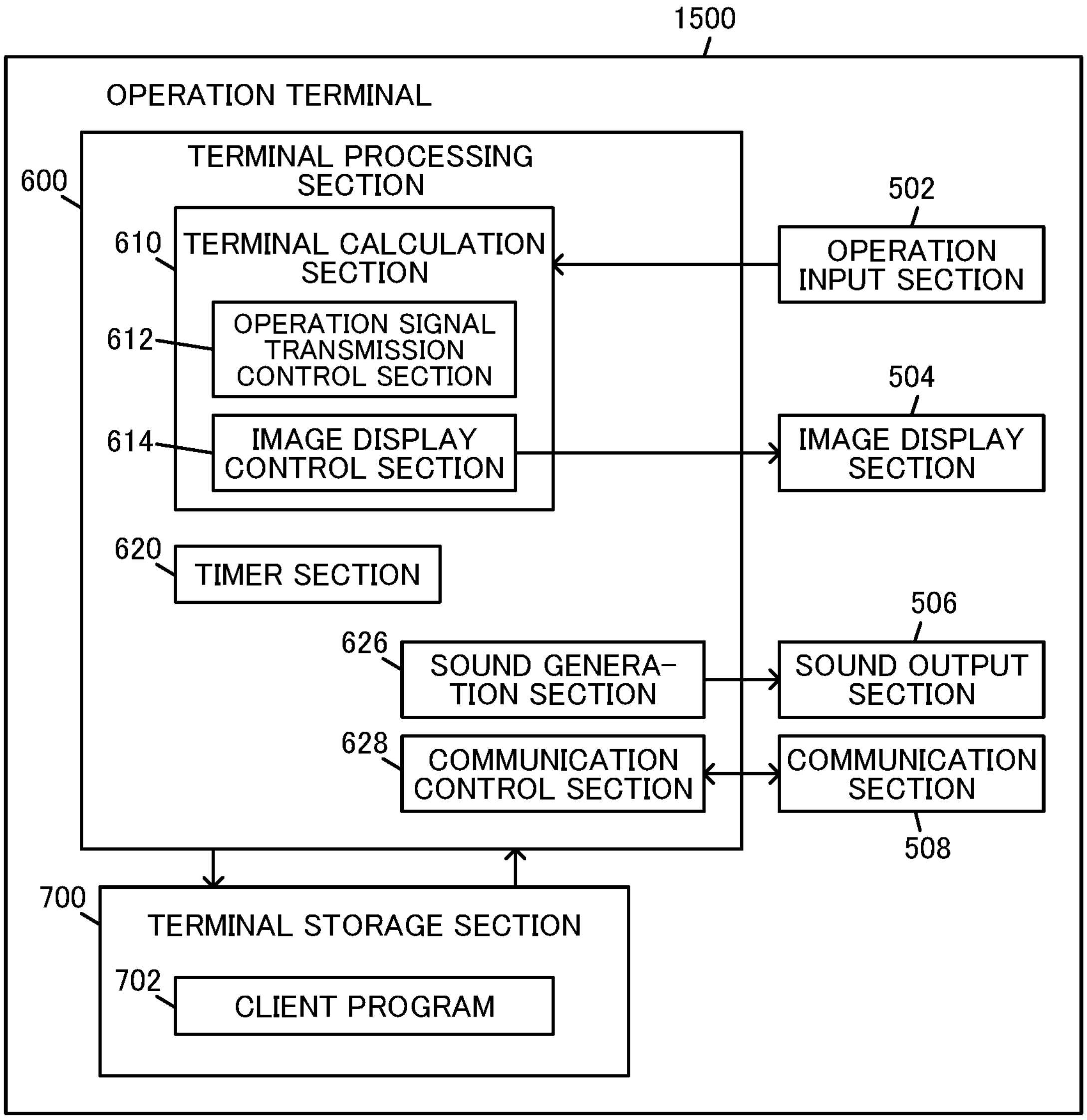
FIG. 21 is a diagram illustrating a functional configuration of an operation terminal.

FIG. 21 is a block diagram illustrating an example of a functional configuration of the operation terminal 1500. According to FIG. 21, the operation terminal 1500 includes an operation input section 502, an image display section 504, a sound output section 506, a communication section 508, a terminal processing section 600, and a terminal storage section 700.

The operation input section 502 outputs operation input signals to the terminal processing section 600 in accordance with various operation input by the player 3. For example, the operation input section 502 can be implemented by a touch panel, a push switch, a joystick, a touch pad, a track ball, an accelerometer, a gyro, or a CCD module.

The terminal processing section 600 is implemented, for example, by a microprocessor such as a CPU or a GPU and electronic components such as an IC memory, and controls input/output of data with respect to the various functional sections including the operation input section 502 and the terminal storage section 700. The terminal processing section 600 executes various calculation processes based on predetermined programs, data, and operation signals from the operation input section 502, and data received from the server system 1000 to control the operation of the operation terminal 1500. The terminal processing section 600 also includes a terminal calculation section 610, a timer section 620, a sound generation section 626, and a communication control section 628.

The terminal calculation section 610 includes an operation signal transmission control section 612 and an image display control section 614, and performs control to cause the operation terminal 1500 to implement functions as a client device that communicates with the server system 1000.

The operation signal transmission control section 612 performs a process of transmitting various types of data and requests to the server system 1000 in accordance with operation performed on the operation input section 502.

The image display control section 614 performs control for displaying a game screen, various operation screens, or the like based on various types of image data received from the server system 1000. The image display control section 614 generates image signals for displaying these images, and outputs the signals to the image display section 504. The image display section 504 displays various images based on the image signals input from the image display control section 614. For example, the image display section 504 can be implemented by an image display device such as a touch panel, a flat panel display, a projector, or a head-mounted display.

The timer section 620 uses a system clock to measure the current date and time or the like.

The sound generation section 626 is implemented, for example, by a processor such as a digital signal processor (DSP) or a sound synthesizing IC, or an audio codec for playing a sound file, and generates sound signals for sound effects, BGM, various operation sounds, or the like related to the game to output to the sound output section 506. The sound output section 506 outputs the sound effects, BGM, or the like based on the sound signals input from the sound generation section 626.

The communication control section 628 performs data processing related to data communication, and implements data exchange with an external device through the communication section 508. The communication section 508 connects to the communication network N to implement communication. For example, the communication section 508 is implemented by a transceiver, a modem, a terminal adaptor (TA), a jack for wired communication cable, a control circuit, or the like.

The terminal storage section 700 stores system programs and various types of data for causing the terminal processing section 600 to implement given functions. The terminal storage section 700 is also used as a work area for the terminal processing section 600, and temporarily stores results of calculations executed by the terminal processing section 600 in accordance with various programs, input data from the operation input section 502, or the like. For example, the terminal storage section 700 is implemented by an IC memory such as RAM or ROM, a magnetic disk such as a hard disk, or an optical disk such as a CD-ROM or a DVD. According to the present embodiment, the terminal storage section 700 stores a client program 702.

[Flow of Process]

Figure 22:
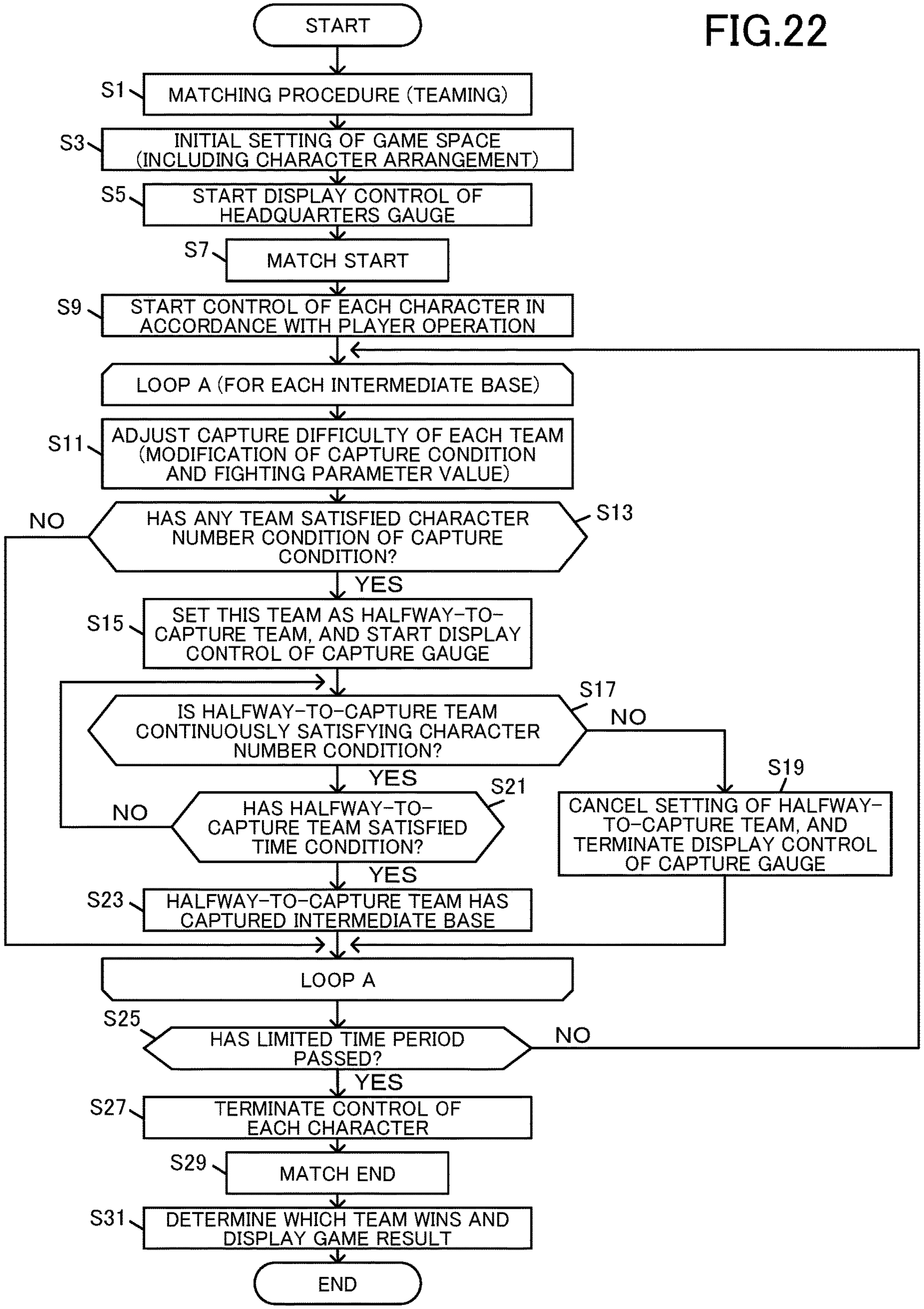
FIG. 22 is a flowchart of game processing.

FIG. 22 is a flowchart illustrating a flow of game processing. This process relates to execution control for each gameplay, and is executed by the game management section 210.

First, the matching control section 212 performs a matching procedure to divide the players 3 to participate in the game into teams (step S1). A matching method can be implemented in a similar manner as in known team match multi-play online games. Next, based on the game initial setting data 310, initial settings are performed including building the game field 10 in the game space and disposing the characters 5 operated by the respective players 3 (step S3). Next, the headquarters gauge display control section 216 starts the display control of the headquarters gauges 20 in the game screen displayed on the operation terminal 1500 of each of the players 3 (step S5). Then, the match between the teams formed by matching is started (step S7), and the control of the respective characters 5 is started by the character control section 214 in accordance with the operation by the players (step S9).

During the match, the intermediate base capture control section 220 performs repetitive processing (loop A) for each of the intermediate bases 14 in the game field 10. In the repetitive processing (loop A), the adjustment control section 222 first adjusts the capture difficulty of the target intermediate base 14 for each of the teams (step S11). The adjustment of the capture difficulty includes modification of the capture condition of the target intermediate base 14 and modification of the fighting parameter value of the relevant team.

Next, the intermediate base capture control section 220 determines whether each of the teams has satisfied the character number condition of the capture condition for the relevant team. When either of the teams has satisfied the character number condition (step S13: YES), the intermediate base capture control section 220 sets this team as the halfway-to-capture team in relation to the target intermediate base 14, and starts the display control of the capture gauge 24 on the game screen of each of the players 3 (step S15).

When the halfway-to-capture team stops satisfying the character number condition before satisfying the time condition (step S17: NO), the intermediate base capture control section 220 cancels the setting of the halfway-to-capture team, and terminates the display control of the capture gauge 24 (step S19). When the halfway-to-capture team has satisfied the time condition by maintaining the satisfying state of the character number condition until a predetermined time has passed (step S21: YES), the intermediate base capture control section 220 determines that the halfway-to-capture team has captured the target intermediate base 14 and sets the target intermediate base 14 to belong to this team (step S23). The procedures described above are the repetitive processing (loop A) for the target intermediate base 14.

After the repetitive processing (loop A) has been performed with every one of the intermediate bases 14 as the target intermediate base, the elapsed time from the start of the match is determined. When the predetermined limited time period has not passed yet (step S25: NO), the process returns after the step S9. When the predetermined limited time period has passed since the start of the match (step S25: YES), the control of the characters 5 by the character control section 214 is terminated (step S27), and the match is terminated (step S29). Then, victory or defeat is determined based on the headquarters parameter value of each of the teams or the like, and a game result is displayed on the operation terminal 1500 of each of the players 3 (step S31). Upon completion of the foregoing procedures, the process is terminated.

Operation and Effect

As described above, according to the present embodiment, a system for changing a situation in the team match game can be provided. For example, superiority or inferiority of each of the teams can be determined based on the conquered degree of the headquarters indicated by 1) the headquarters parameter value of each of the teams, or 2) the gauge value that increases or decreases in accordance with the headquarters parameter. Accordingly, since the capture difficulty of the intermediate base is adjusted to make the capture easier for the team determined to be inferior, the capture of the intermediate base by the inferior team can be assisted. That is, a system for giving an opportunity allowing the inferior team to break through a disadvantageous situation can be provided. Furthermore, since the capture difficulty of the intermediate base is adjusted instead of the headquarters of the opponent team that should be conquered, the capture of the intermediate base is made easier for the inferior team while an advantageous situation of the opponent team is maintained. As a result, it is possible to indirectly assist the inferior team to conquer the headquarters of the opponent team by using the captured intermediate base as a foothold.

Modification Example

Applicable embodiments of the present disclosure are not limited to the embodiment described above. The embodiment can be changed as appropriate without deviating from the gist of the present disclosure.

For example, according to the embodiment described above, the online game is implemented in the game system 1 that is the client-server computer system. Alternatively, the online game may be implemented in a computer system in which a plurality of operation terminals 1500 are connected in a peer-to-peer fashion. In such a case, any one of the plurality of operation terminals 1500 performs the functions of the server system 1000 according to the embodiment described above. Alternatively, the plurality of operation terminals 1500 may share the functions of the game management section 210.

Furthermore, according to the embodiment described above, a victory condition of the game is that the team that conquers the headquarters 12 of the opponent team first wins. If neither of the teams is able to conquer the headquarters 12 of the opponent team by the end of the limited time period, the team with a higher gauge value wins. Alternatively, the victory condition may be as follows. That is, while a condition that the team that conquers the headquarters 12 of the opponent team first wins is maintained, if neither of the teams is able to conquer the headquarters 12 of the opponent team by the end of the limited time period, the team with a larger number of captured intermediate bases 14 wins. When the victory condition is modified in such a manner, the gauge value may be increased or reduced in accordance with the number of captured intermediate bases 14 to indicate the game progress status.

Furthermore, instead of the number of captured intermediate bases 14, a capture point having weight different for each of the intermediate bases 14 may be assigned to each of the intermediate bases 14, and the team with higher capture points may win. In such a case, the gauge value may be increased or reduced in accordance with a total of the capture points to indicate the game progress situation.

Although only some embodiments of the present disclosure have been described in detail above, those skilled in the art will readily appreciate that many modifications are possible in the embodiments without materially departing from the novel teachings and advantages of this disclosure. Accordingly, all such modifications are intended to be included within scope of this disclosure.

What is claimed is:

1. A computer system comprising:

at least one processor or circuit programmed to execute:

setting a first team headquarters of a first team, a second team headquarters of a second team, and at least one intermediate base that either of the teams can alternately capture to use as a base in a game space;

controlling display of a first gauge whose gauge value increases or decreases in accordance with at least one of a headquarters parameter value of the first team and game progress status of the first team, and a second gauge whose gauge value increases or decreases in accordance with at least one of a headquarters parameter value of the second team and game progress status of the second team; and controlling adjustment of capture difficulty of the intermediate base based on the gauge value of the first gauge and the gauge value of the second gauge.

2. The computer system as defined in claim 1, wherein the intermediate base is disposed at a position reachable by a shorter distance than a distance to reach the headquarters of the second team as seen from the headquarters of the first team and also reachable by a shorter distance than a distance to reach the headquarters of the first team as seen from the headquarters of the second team.

3. The computer system as defined in claim 1, wherein controlling the adjustment of the capture difficulty includes modifying the capture difficulty based on a difference between the gauge value of the first gauge and the gauge value of the second gauge.

4. The computer system as defined in claim 1, wherein controlling the adjustment of the capture difficulty includes adjusting the capture difficulty by modifying at least one of a fighting parameter value of a team capturing the intermediate base and a fighting parameter value of a team not capturing the intermediate base.

5. The computer system as defined in claim 4, wherein controlling the adjustment of the capture difficulty includes adjusting the capture difficulty by modifying a fighting parameter value of a given character in the team not capturing the intermediate base.

6. The computer system as defined in claim 1, wherein controlling the adjustment of the capture difficulty includes adjusting the capture difficulty by modifying a given capture condition for capturing the intermediate base.

7. The computer system as defined in claim 1, wherein controlling the adjustment of the capture difficulty includes variably controlling an adjustment degree for adjusting the capture difficulty.

8. The computer system as defined in claim 7, wherein the at least one intermediate base includes a plurality of intermediate bases disposed in the game space, and variably controlling the adjustment degree includes modifying the adjustment degree related to each of the plurality of intermediate bases based on a disposed position of the each intermediate base in the game space.

9. The computer system as defined in claim 8, wherein variably controlling the adjustment degree includes reducing the adjustment degree related to the intermediate base disposed in a first distance to reach the headquarters of either of the first team and the second team, compared with the adjustment degree related to the intermediate base disposed in a second distance, the first distance being shorter than the second distance.

10. The computer system as defined in claim 7, wherein variably controlling the adjustment degree includes modifying the adjustment degree based on characteristics of a character in the first team and characteristics of a character in the second team, and the characteristics are any of a type, level, rarity value, attribute, and fighting ability value of the character.

11. The computer system as defined in claim 10, wherein variably controlling the adjustment degree includes modifying the adjustment degree based on a total value of the first team based on the characteristics of characters in the first team and a total value of the second team based on the characteristics of characters in the second team.

12. The computer system as defined in claim 7, wherein variably controlling the adjustment degree includes modifying the adjustment degree based on a combination of characters in the first team and a combination of characters in the second team.

13. The computer system as defined in claim 7, wherein variably controlling the adjustment degree includes modifying the adjustment degree based on a formation based on disposed positions of characters in the first team in the game space and a formation based on disposed positions of characters in the second team in the game space.

14. The computer system as defined in claim 7, wherein variably controlling the adjustment degree includes modifying the adjustment degree based on progress status of a game.

15. The computer system as defined in claim 14, wherein the at least one intermediate base includes a plurality of intermediate bases disposed in the game space, and variably controlling the adjustment degree includes modifying the adjustment degree based on capture status of the plurality of intermediate bases of each of the teams.

16. The computer system as defined in claim 14, wherein variably controlling the adjustment degree includes modifying the adjustment degree based on an elapsed time of the game.

17. A game system comprising:

a server system that is the computer system as defined in claim 1; and an operation terminal used for gameplay by each player who operates a character that belongs to a team.

18. An execution control method by a computer system for controlling execution of:

setting a first team headquarters of a first team, a second team headquarters of a second team, and at least one intermediate base that either of the teams can alternately capture to use as a base in a game space;

controlling display of a first gauge whose gauge value increases or decreases in accordance with at least one of a headquarters parameter value of the first team and game progress status of the first team, and a second gauge whose gauge value increases or decreases in accordance with at least one of a headquarters parameter value of the second team and game progress status of the second team; and controlling adjustment of capture difficulty of the intermediate base based on the gauge value of the first gauge and the gauge value of the second gauge.

* * * * *